(12) United States Patent
Parker et al.

(10) Patent No.: US 12,129,685 B2
(45) Date of Patent: *Oct. 29, 2024

(54) CABLE LOCK SYSTEMS AND METHODS

(71) Applicant: Rivian IP Holdings, LLC, Plymouth, MI (US)

(72) Inventors: Larry Parker, Bloomfield Hills, MI (US); Matthew Braun, Ann Arbor, MI (US); Christian Elder, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/879,314

(22) Filed: Aug. 2, 2022

(65) Prior Publication Data

US 2022/0372793 A1 Nov. 24, 2022

Related U.S. Application Data

(63) Continuation of application No. 16/682,742, filed on Nov. 13, 2019, now Pat. No. 11,434,661.
(Continued)

(51) Int. Cl.
*E05B 45/00* (2006.01)
*B62H 5/00* (2006.01)
(Continued)

(52) U.S. Cl.
CPC ........... *E05B 45/005* (2013.01); *B62H 5/003* (2013.01); *B62H 5/20* (2013.01); *E05B 39/00* (2013.01);
(Continued)

(58) Field of Classification Search
CPC ...... E05B 39/00; E05B 45/005; E05B 67/003; E05B 67/006; E05B 71/00;
(Continued)

(56) References Cited

U.S. PATENT DOCUMENTS 3,755,778 A  8/1973  Kennedy et al.
3,824,540 A  7/1974  Smith
(Continued)

FOREIGN PATENT DOCUMENTS

CN  2103613 U  5/1992
CN  101184901 A  5/2008
(Continued)

OTHER PUBLICATIONS

DE 102021116257 A1 Dec. 29, 2022 (Year: 2022).*
International Search Report and Written Opinion received for PCT Patent Application No. PCT/US2019/061250, dated Apr. 2, 2020.

*Primary Examiner* — Christopher J Boswell
(74) *Attorney, Agent, or Firm* — Haley Guiliano LLP

(57) ABSTRACT

A smart cable lock is provided that is configured to mechanically secure items and provide an automatic determination that securing is achieved. The smart cable may be integrated into a vehicle, or otherwise may communicate with a vehicle. The vehicle includes one or more ports configured to house the cable when not in use. In some embodiments, an accessory includes one or more ports configured to engage with the connector. In some embodiments, the cable is affixed to the vehicle at one end, using a retractor, for example, and can be unspooled, intertwined with equipment, and then secured to a port on the vehicle. The smart cable lock secures and releases a latch based on user indications and authorizations. For example, if the cable is destroyed or damaged, or an unauthorized indication is made, the cable lock system may sound an alarm, or otherwise alert the user.

18 Claims, 11 Drawing Sheets

Related U.S. Application Data

(60) Provisional application No. 62/760,851, filed on Nov. 13, 2018.

(51) Int. Cl.

| | | |
|---|---|---|
| *B62H 5/20* | (2006.01) | |
| *E05B 39/00* | (2006.01) | |
| *E05B 67/00* | (2006.01) | |
| *E05B 73/00* | (2006.01) | |
| *G08B 13/14* | (2006.01) | |

(52) U.S. Cl.
CPC ........ *E05B 67/006* (2013.01); *E05B 73/0005* (2013.01); *E05B 73/0011* (2013.01); *G08B 13/1445* (2013.01)

(58) Field of Classification Search
CPC . E05B 73/0005; E05B 73/0011; B62H 5/003; B62H 5/20; G08B 13/1445
See application file for complete search history.

(56) References Cited

U.S. PATENT DOCUMENTS

| | | | |
|---|---|---|---|
| 3,971,589 A | 7/1976 | Elrod | |
| 4,525,702 A | 6/1985 | Kitagawa et al. | |
| 4,776,188 A | 10/1988 | Dalaba et al. | |
| 4,878,045 A | 10/1989 | Tanaka et al. | |
| 4,920,334 A | 4/1990 | Devolpi | |
| 5,270,681 A | 12/1993 | Jack | |
| 5,274,353 A | 12/1993 | Bianchi | |
| 5,408,213 A | 4/1995 | Ungarsohn | |
| 5,768,920 A | 6/1998 | De Bevoise | |
| 6,100,802 A * | 8/2000 | Adams ................ | E05B 45/005 70/DIG. 49 |
| 6,349,575 B1 | 2/2002 | Bentley | |
| 7,186,914 B1 | 3/2007 | Knight | |
| 7,233,245 B2 | 6/2007 | O'Neill | |
| 8,770,453 B2 * | 7/2014 | Lang ................... | E05B 73/0005 224/315 |
| 8,854,207 B2 | 10/2014 | Williams | |
| 9,523,218 B1 | 12/2016 | Mcgraw et al. | |
| 9,567,772 B1 | 2/2017 | Snell | |
| 9,830,759 B2 | 11/2017 | Hilton et al. | |
| 10,377,438 B2 | 8/2019 | Prommel et al. | |
| 10,501,136 B2 * | 12/2019 | Shen ....................... | B62H 5/02 |
| 10,641,013 B2 | 5/2020 | Yates et al. | |
| 11,111,695 B2 * | 9/2021 | Lu ........................... | E05B 71/00 |
| 11,434,661 B2 * | 9/2022 | Parker ..................... | B62H 5/20 |
| 11,648,886 B2 * | 5/2023 | Oros ..................... | B60R 9/045 224/315 |
| 2003/0089144 A1 | 5/2003 | Hoffman | |
| 2005/0016232 A1 | 1/2005 | Baloga | |
| 2005/0223756 A1 | 10/2005 | Ling et al. | |
| 2006/0162407 A1 * | 7/2006 | Kuhblank ............. | B62H 5/003 70/233 |
| 2008/0066502 A1 | 3/2008 | Sheehan | |
| 2009/0031766 A1 | 2/2009 | Stobbe | |
| 2010/0052907 A1 | 3/2010 | Shannon et al. | |
| 2012/0144885 A1 | 6/2012 | Mills | |
| 2012/0299755 A1 | 11/2012 | Jones | |
| 2014/0000322 A1 | 1/2014 | Williams | |
| 2019/0166827 A1 | 6/2019 | Rorick | |

FOREIGN PATENT DOCUMENTS

| | | | |
|---|---|---|---|
| CN | 104640763 A | | 5/2015 |
| CN | 106154821 A | | 11/2016 |
| CN | 106437349 A | | 2/2017 |
| CN | 107038773 A | | 8/2017 |
| CN | 207392949 U | | 5/2018 |
| DE | 29812378 U1 | | 4/1999 |
| DE | 102021116257 A1 | * | 12/2022 |
| EP | 0869237 A2 | | 10/1998 |
| EP | 2815918 A2 | | 12/2014 |
| EP | 2878290 A1 | | 6/2015 |
| GB | 2503011 A | | 12/2013 |
| JP | 2013-014979 A | | 1/2013 |
| WO | 02/04280 A1 | | 1/2002 |

* cited by examiner

CABLE LOCK SYSTEMS AND METHODS

CROSS-REFERENCE TO RELATED APPLICATION

This application is a continuation of U.S. patent application Ser. No. 16/682,742, filed Nov. 13, 2019, which claims the benefit of U.S. Provisional Patent Application No. 62/760,851, filed Nov. 13, 2018, the disclosures of which are hereby incorporated by reference herein in their entireties.

SUMMARY

Cable locks are used to secure equipment, and typically include a metal cable, having a plastic covering, with a locking mechanism at the ends. The mechanism usually includes loops at the ends, through which a lock can be affixed, or integrated locking mechanisms. Equipment such as bicycles, gates, vehicle cargo, outdoor furniture, or other items may be secured. In many instances, locks include keyed locks, combination locks, or a combination thereof.

While a conventional cable lock provides a mechanical securement, it is susceptible to mechanical destruction by a nefarious operator (e.g., cutting the cable). Although mechanical destruction may require specialized tools, know-how, and opportunity, there is little to alert the equipment owner that the cable lock has been damaged. It would be desirable for a cable lock to provide an indication to a user, other than an after-the-fact observation by the user, that it has been compromised.

A user can employ cable locks to secure recreational equipment, auxiliaries, or a vehicle itself. It would be advantageous for a cable lock system to be integrated into a vehicle, with an automatic indication to a user of securement, de-securement, and unauthorized activity.

In some embodiments, the present disclosure is directed to a cable lock system for a vehicle. In some embodiments, the cable lock system includes a cable, a first port and a second port. The cable includes a first end that is removable from the vehicle, and a second end. The cable also includes a connector affixed to the first end. The first port is integrated into the vehicle and is configured to removably engage the connector when the cable is retracted. The second port is configured to engage the connector when the cable is extended from the first port. For example, when the cable is removed for use, the connector can be secured to the second port. Further, when not in use, the connector can be housed in the first port.

In some embodiments, the cable lock system includes a retractor affixed to the second end of the cable. The retractor is configured to apply a retraction force when the cable is extended. For example, the retractor may be spring-loaded or ratcheting.

In some embodiments, the second port is integrated into the vehicle. For example, in some embodiments, the second port and the first port are integrated into a faceplate arranged on the exterior of the vehicle.

In some embodiments, the second end of the cable includes a second connector configured to removably engage with the second port.

In some embodiments, the cable lock system includes a dock that is separate from the vehicle. The second port is integrated into the dock, and the second end of the cable includes a second connector configured to engage with the second port.

In some embodiments, the cable lock system includes a manually actuated latch configured to secure and release the connector from the second port.

In some embodiments, the second port includes a first electrical terminal, and the connector includes a second electrical terminal. The first electrical terminal is configured to contact the second electrical terminal when the second port is engaged to the connector.

In some embodiments, the cable lock system includes control circuitry integrated into the vehicle. The control circuitry is coupled to the first electrical terminal, and is configured to determine whether the connector is engaged to the second port.

In some embodiments, the cable is electrically conductive along its length from the first end to the second end, and the second electrical terminal is electrically coupled to the first end of the cable. For example, in some embodiments, the cable may include braided metal, corrugated metal, or other electrically conductive components.

In some embodiments, the control circuitry is configured to apply an electrical signal to the second end of the cable. The control circuitry is further configured to detect the electrical signal at the first end of the cable. The control circuitry determines whether the connector is engaged to the second port based on the detection.

In some embodiments, the cable lock system includes a powered latch configured to secure and release the connector from the second port. The powered latch is coupled to the control circuitry.

In some embodiments, the control circuitry is configured to receive a user indication to release the powered latch. The control circuitry is further configured to determine whether the user indication is authorized. If the user indication is authorized, the control circuitry causes the powered latch to be released.

In some embodiments, the present disclosure is directed to a method of operating a cable lock for a vehicle. The method includes applying, using control circuitry, an electrical signal at a first end of a cable. The method further includes detecting, using the control circuitry, the electrical signal at a second end of the cable. The method further includes determining whether the cable lock is arranged for securement. The method further includes securing a powered latch of the cable lock based at least in part on whether the cable lock is arranged for securement.

In some embodiments, the method further includes identifying user information, and
securing the powered latch of the cable lock further based at least in part on the user information.

In some embodiments, the method further includes determining whether the second end of the cable is secured by the powered latch.

In some embodiments, determining whether the cable lock is arranged for securement includes determining whether the cable is intact.

In some embodiments, determining whether the cable lock is arranged for securement includes determining whether a connector of the cable is engaged with a port of the vehicle.

In some embodiments, the present disclosure is directed to a method of operating a cable lock for a vehicle. The method includes receiving an indication to release a power latch securing the cable lock. The method further includes determining whether the indication to release is authorized. If it is determined that the indication to release is authorized, the method further includes causing the power latch to be released.

In some embodiments, the indication to release the power latch includes a user indication, and determining whether the indication to release is authorized includes identifying a user. For example, in some embodiments, only some users may be authorized to release the power latch (e.g., such as the vehicle owner).

In some embodiments, the indication to release includes a user indication, and determining whether the indication to release is authorized includes identifying a location of a user. For example, in some embodiments, identifying the location includes identifying a key fob within a suitable distance of the vehicle.

In some embodiments, the method further includes identifying unauthorized access or attempted unauthorized access. In response, the method includes performing at least one of sending a notification to an authorized user, sending a notification to security personnel, activating an audible alarm, and logging an event in a log stored in memory.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Figure 1:
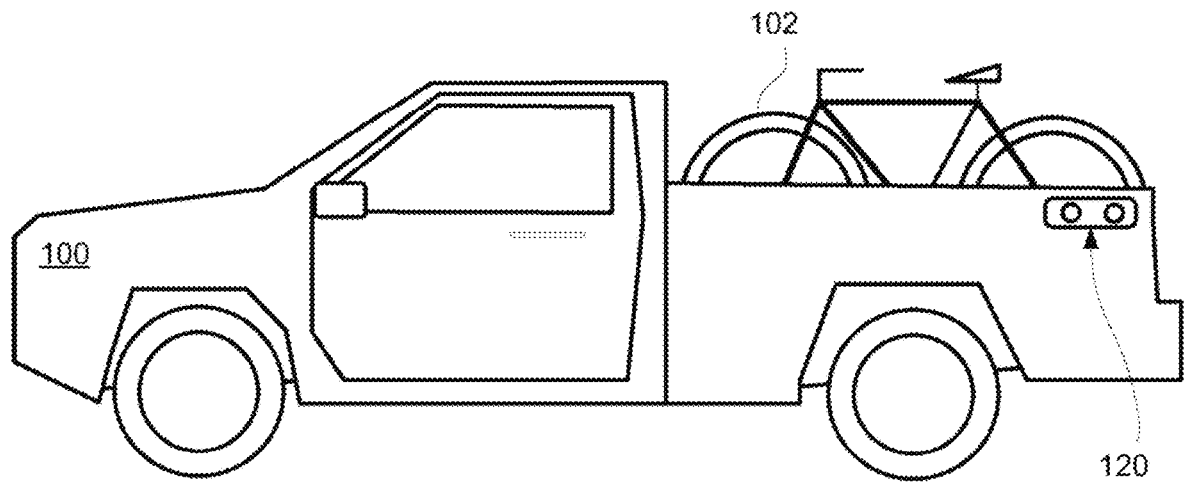
FIG. 1 shows a side view of an illustrative vehicle having a cable lock system, in accordance with some embodiments of the present disclosure.

The present disclosure is directed to a smart cable lock system. In some embodiments, for example, the cable includes a braided cable, cord, webbing, leash, chain, wire or other flexible linear element that can be woven through, wrapped around or otherwise intertwined with cargo that is internal or external to the cabin of a vehicle. In some embodiments, the cable may be intertwined with cargo and connected to corresponding ports of the vehicle. In some embodiments, the cable may be attached to cargo by way of modular attachments such as, for example, an accessory configured to communicate with the vehicle.

In some embodiments, the connection of one or more cable ends (e.g., having corresponding connectors) to corresponding ports of the vehicle may be indicated by an electrical circuit coupled to a control system. For example, plugging the ends of the cable into corresponding ports of the vehicle may electrically couple portions of a circuit (e.g., complete a current loop, or apply voltage to an end of the cable). Accordingly, connection of the connector to a suitable port can be sensed electrically. To illustrate, both ends of the cable may be connected to corresponding ports of the vehicle in order to complete a current loop, which may be detected at one or both ends of the cable. In a further illustrative example, if both loose ends of the cable are coupled to each other, or to an accessory, the completed loop, and disconnection thereof, may be detected. In a further illustrative example, a single end of the cable may be attached to (e.g., via a retractor) the vehicle, and the other end may be removable, and when coupled to a locking port in or on the vehicle, the loop is completed. In a further illustrative example, an accessory may be coupled to the two ends of the cable, allowing the electronic signal to propagate through the cable to complete the loop. Electrical signals may include, for example, a DC voltage (e.g., 12 VDC), a DC voltage with modulation, an AC voltage, a waveform (e.g., a 1 kHz square wave), a current, a binary signal (e.g., a digital signal protocol such as serial communication), an analog signal, any other suitable signal, or any combination thereof which may indicate that ends of an electrically conductive cable are connected or disconnected.

In some embodiments, an accessory may be used to couple the cable and provide an electrical circuit to determine if the cable is connected or disconnected. In some embodiments, the accessory may include a modular attachment, designed to work with products in the marketplace. For example, an accessory may include a locking assembly which plugs into a standard surfboard fin box. The cable end may attach directly to the accessory, or can also be woven through an included ring on the accessory in order to connect many items to a single cable. In some such embodiments, the accessory may include communications hardware, the connectors may include more than one electrical terminal, the cable may include more than one conductor, or there may be a combination thereof.

In accordance with the present disclosure, the cable lock systems described herein are a deterrent for theft. For example, the cable would have to be cut in order to take any items from the vicinity of the vehicle. The cable may include a level of intelligence integrated into it which would allow the vehicle to become aware of any harm done to the cable, or attempt to retract/extend any additional length of cable in the case that a retractor is employed. In some embodiments, a cable lock system allows, for example, for an alert to be sent to a designated member of the vehicle's, or user's, social network. In some embodiments, a cable lock system may be configured to generate or trigger alarms that are set off from the vehicle itself (e.g., using a built-in car alarm system). Accordingly, the cable lock systems disclosed herein may provide intelligent security for items typically secured only by mechanically locking cables or by line of sight. Intelligent functionality may provide users a way to confidently, easily, and quickly secure items in, on, or around their vehicle.

FIGS. 1-18 shows illustrative cable lock systems, or components thereof, in accordance with some embodiments of the present disclosure. Any of the components, arrangements, features, or other aspects shown in FIGS. 1-18 may be combined, replaced, or otherwise modified, in accordance with the present disclosure.

FIG. 1 shows a side view of illustrative vehicle 100 having cable lock system 120, in accordance with some embodiments of the present disclosure. Stored in the cargo bed of vehicle 100 is item 102 (e.g., a bicycle as illustrated). Cable lock system 120 may be used, for example, when a user is away from vehicle 100, or when vehicle 100 is in transit, to mechanically secure item 102 and to indicate that the system is secure.

Figure 2:
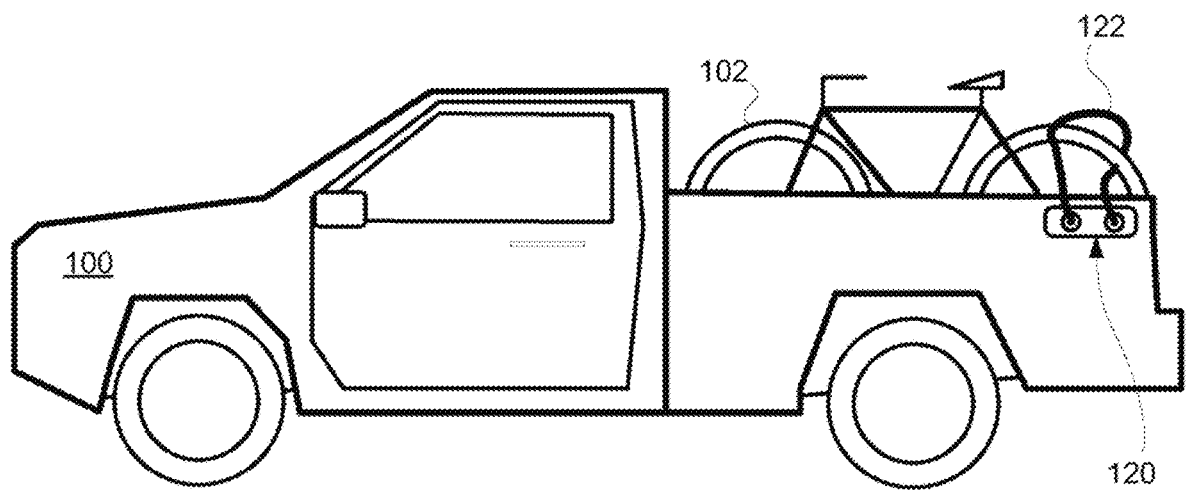
FIG. 2 shows a side view of the illustrative vehicle of FIG. 1 with equipment secured by the cable lock system, in accordance with some embodiments of the present disclosure.

FIG. 2 shows a side view of illustrative vehicle 100 of FIG. 1 with equipment 102 secured by cable lock system 120, in accordance with some embodiments of the present disclosure. Cable lock system 120 includes cable 122, as shown in FIG. 2. As shown, cable 122 is intertwined with item 102 (e.g., wound through wheel spokes as illustrated). In some embodiments, cable 122 may include two end connectors (i.e., one at each end), which interface to and engage with corresponding cable lock ports of cable lock system 120. When secured, not only is cable 122 mechanically affixed to vehicle 100, but also a control system detects that the cable is connected. In the illustrated example, the control system may be integrated into cable lock system 120, part of vehicle 100, or a combination thereof. Further, once secured, if cable 122 is compromised (e.g., cut, damaged), perturbed (e.g., more length is pulled), or if an unauthorized release is attempted (e.g., an unauthorized user attempts to unlock the secured cable), the control system may detect the action. In response, the control system may provide an indication (e.g., a message to an authorized user's mobile device), activate an alarm (e.g., activate a car alarm of vehicle 100), or provide any other suitable response or combination of responses thereof.

Figure 3:
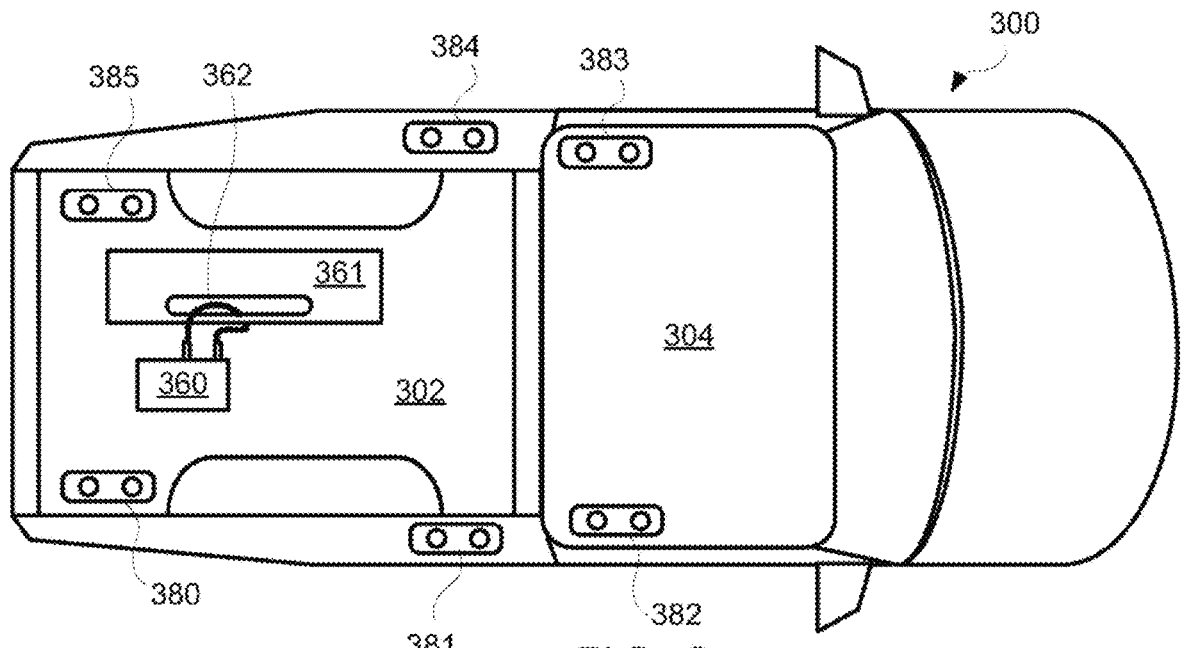
FIG. 3 shows a top view of an illustrative vehicle with equipment secured by an illustrative accessory, in accordance with some embodiments of the present disclosure.
Figure 4:
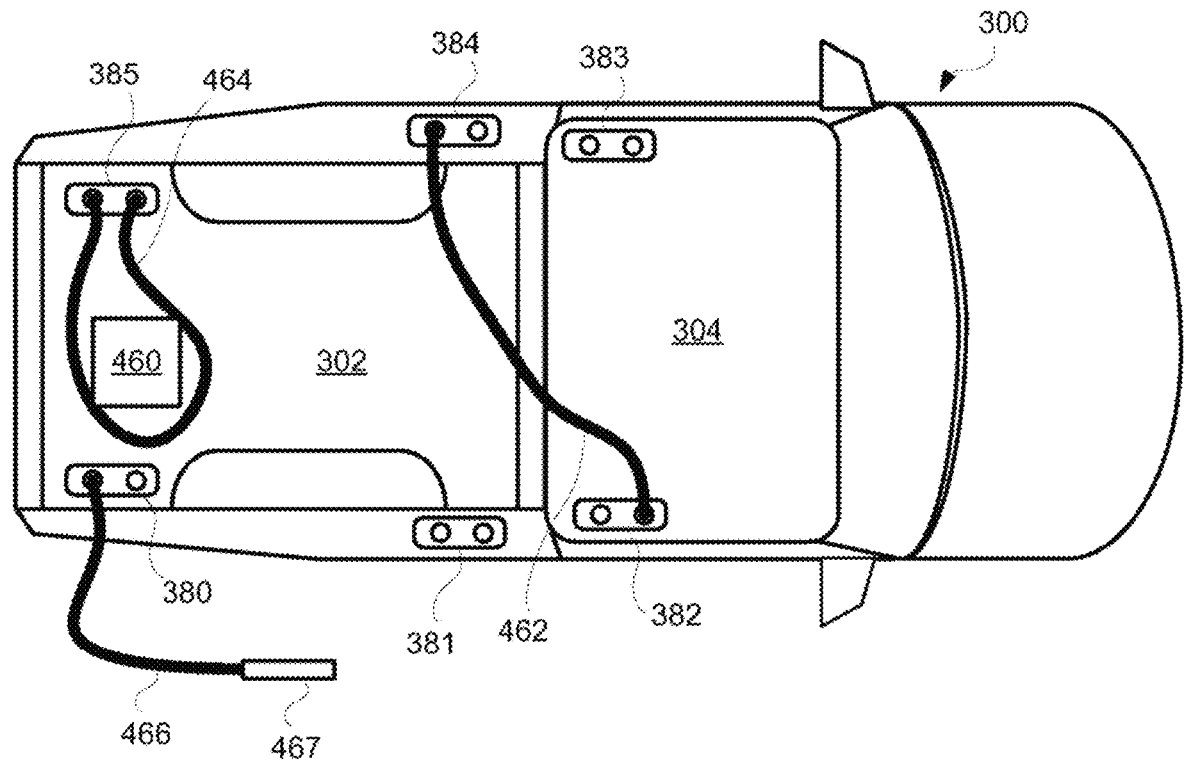
FIG. 4 shows a top view of the illustrative vehicle of FIG. 3 having several cables secured, and an unsecured cable, in accordance with some embodiments of the present disclosure.

FIG. 3 shows a top view of illustrative vehicle 300 with equipment secured by illustrative accessory 360, in accordance with some embodiments of the present disclosure. Cable 362 is secured to accessory 360, thus securing equipment 361 (e.g., a toolbox as illustrated). Vehicle 300 includes illustrative cable lock ports 380, 381, 382, 383, 384, and 385, as shown in FIGS. 3-4. Accessory 360 is configured to secure cable 362, and is configured to communicate with a communications interface of vehicle 300.

Cable lock ports 380-385 are arranged around vehicle 300 including, for example, along cargo area 302 and roof 304. Although not shown in FIGS. 3-4, one or more cable lock ports may be included at any suitable location around a vehicle including, for example, the hood, a side of the vehicle (e.g., along a fender, or a quarter panel), a door, a trunk, the undercarriage, a structural support (e.g., an A, B, C, or D pillar), a bumper, a valence, a tailgate, a wheel well, a frame element, integrated in lighting or other assemblies, any other suitable location, or any combination thereof.

FIG. 4 shows a top view of illustrative vehicle 300 of FIG. 3 having cables 462 and 464 secured, and unsecured cable 466, in accordance with some embodiments of the present disclosure. Equipment 460 is secured by cable 464 to corresponding cable lock ports 385. For example, one end of cable 464 may be coupled to a reel with a spring-loaded or ratcheting retractor. The other end of cable 464 may be "free" (e.g., able to be removed and intertwined) and include a connector. The reel may be arranged at a first port of cable lock ports 385, which may, for example, include a home receptacle to house the connector when not in use. The connector may have been removed from the first port, secured through equipment 460 and then engaged with another port of cable lock ports 385, thus securing equipment 460.

Cable 462 is secured to corresponding ports of cable lock ports 382 and 384 for storage, although not specifically securing any equipment. Cable 462 may include two free ends (e.g., with two corresponding connectors), or one free end (e.g., with the other end permanently affixed to vehicle 300), for example, in accordance with some embodiments of the present disclosure.

Cable 466, which has one free end as illustrated, has been extended but is unsecured, as connector 467 is not engaged with a cable lock port. For example, as illustrated, a user may have removed connector 467 from a first port of cable lock ports 380, and pulled to extend cable 466 to the illustrated length. Because connector 467 is not engaged to a port, cable 466 and connector 467 do not complete a circuit, modify a circuit significantly, or otherwise provide an electrical indication of connection, and accordingly a control system may determine that cable 466 is unsecured. If a user desired to secure further equipment to vehicle 300, connector 467 could be engaged with any suitable port of cable lock ports 380, 381, or 383, for example, depending upon the geometric configuration, and securing force profile, desired.

Referencing FIGS. 3-4, each of cable lock ports 380-385 is communicatively coupled, electrically coupled, or both, to a control system. The control system may include a stand-alone system in communication with vehicle 300, an integrated control system of vehicle 300, or a combination thereof. For example, a stand-alone controller, coupled to a power supply and alarm of vehicle 300, may be installed under the hood of vehicle 300, and may be electrically coupled by one or more wires, and optionally the vehicle ground, to each of cable lock ports 380-385. In a further example, vehicle 300 may include the control system in its on-board computer (e.g., which may also control other aspects of vehicle operation such as drivetrain operation and cabin accessories), and each of cable lock ports 380-385 may be wired to the control system (e.g., similar to wiring for lighting or other auxiliaries).

In some embodiments, such as those illustrated in FIGS. 3-4 having multiple cable lock ports, each cable lock port may be addressed or otherwise distinguishable from one another by the control system. In some embodiments, each cable lock port (e.g., of cable lock ports 380-385 of FIGS. 3-4) has a corresponding and unique test signal. For example, each cable lock port may have a corresponding waveform shape as a test signal, a unique voltage level of a test signal, or both. To illustrate, each cable lock port may provide a unique DC voltage, which may be detectable in the cable lock port into which a cable is plugged. In some embodiments, each cable lock port may have a unique address. For example, a connector may include a RFID tag indicating from which cable lock port it is from (e.g., which reel is associated, or which cable lock port the other end is plugged into). To illustrate, each cable lock port may include control circuitry to identity RFID tags, and accordingly may identify a connector that is engaged. In some embodiments, a connector can be engaged with any suitable cable lock port, and no address or identifier is required. For example, each cable lock port may include a keypad or other user input device configured to receive indications to secure and release the corresponding cable lock (e.g., via a powered latch, as described in the context of FIGS. 19-22).

Figure 5:
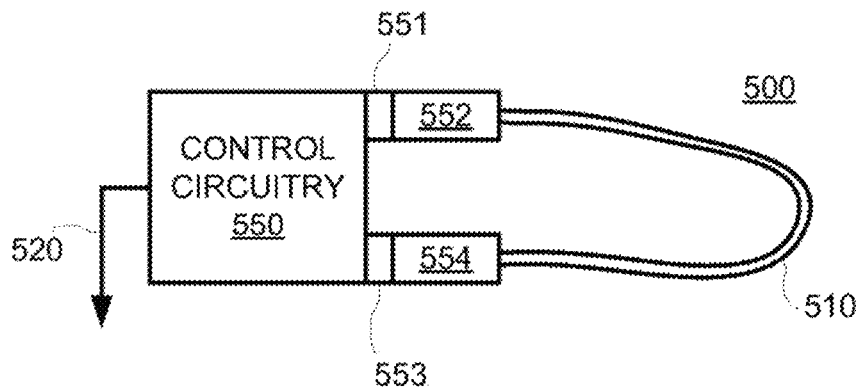
FIG. 5 shows a system diagram of an illustrative cable lock system, having two disconnectable ends, in accordance with some embodiments of the present disclosure.

FIG. 5 shows a system diagram of illustrative cable lock system 500, having two disconnectable ends, in accordance with some embodiments of the present disclosure. Cable 510 includes end connectors 552 and 554, configured to engage with respective ports 551 and 553, which are coupled to control circuitry 550. Control circuitry 550 may communicate, via communications link 520, with a communications interface of a vehicle (not shown), a mobile device (e.g., a user's smartphone), or both.

Figure 6:
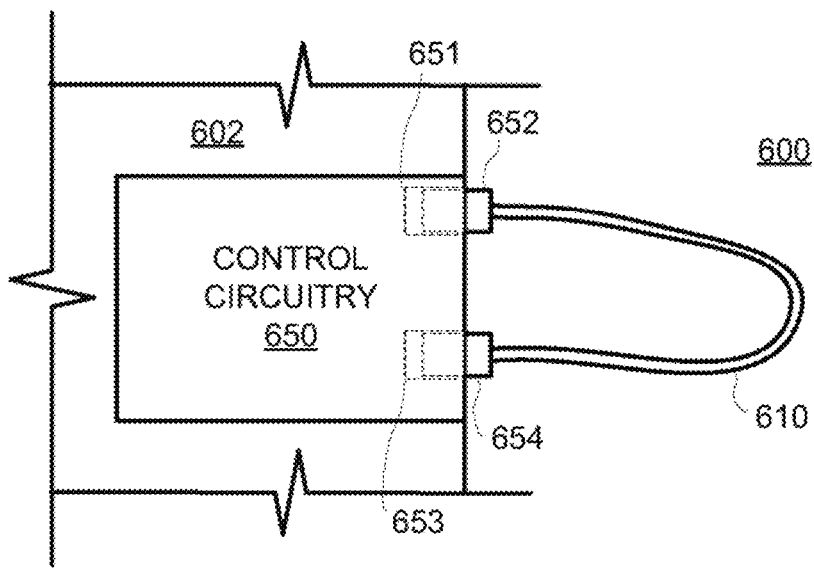
FIG. 6 shows a system diagram of an illustrative cable lock system, having two disconnectable ends, in accordance with some embodiments of the present disclosure.

FIG. 6 shows a system diagram of illustrative cable lock system 600, having two disconnectable ends, in accordance with some embodiments of the present disclosure. Cable 610 includes end connectors 652 and 654, configured to engage with respective ports 651 and 653, which are coupled to control circuitry 650. Control circuitry 650, as illustrated, is integrated into vehicle 602. Cable lock system 600 may be stored separately from vehicle 602, for example.

Figure 7:
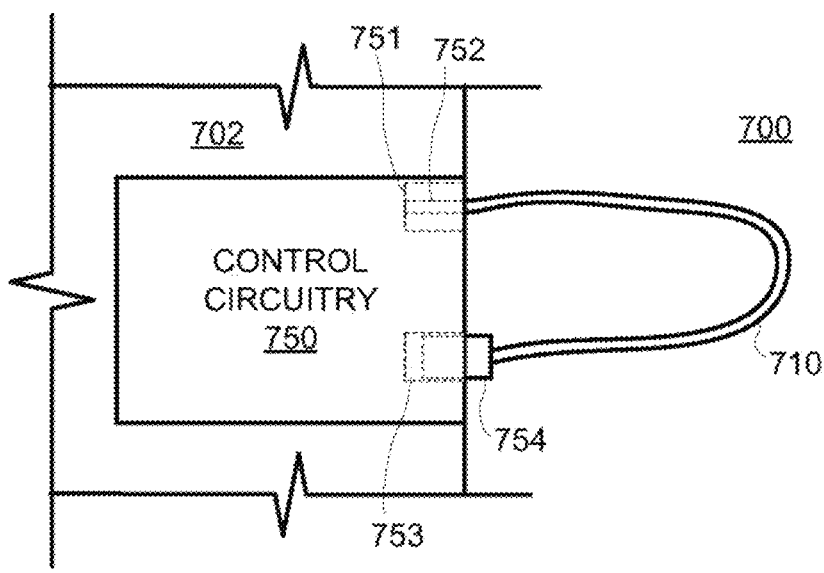
FIG. 7 shows a system diagram of an illustrative cable lock system, having one disconnectable end, in accordance with some embodiments of the present disclosure.

FIG. 7 shows a system diagram of illustrative cable lock system 700, having one disconnectable end, in accordance with some embodiments of the present disclosure. Cable 710 includes end connector 754 (i.e., one free end), configured to engage with port 753, which is coupled to control circuitry 750. Control circuitry 750, as illustrated, is integrated into vehicle 702. Cable 710 includes fixed end 752, which is not configured to be removed from vehicle 702, at least under normal operation. For example, in some embodiments, fixed end 752 may be attached to a reel to allow retraction and extension from vehicle 702. In a further example, in some embodiments, fixed end 752 may be rigidly anchored to vehicle 702 (e.g., to the frame or other suitable structure), which may include a compartment in which excess cable length is stored (e.g., fixed end 752 may be arranged inside of the compartment). In some embodiments, port 751 (e.g., a home receptacle) may be configured to house connector 754 when cable 710 is not secured. In some such embodiments, port 751 is configured to detect whether connector 754 is housed in port 751 or not. For example, connector 754 may include one or more electrical terminals that may engage a corresponding electrical terminal of port 751. Similarly, port 753 may include one or more electrical terminals configured to engage with the one or more electrical terminals of connector 754.

Figure 8:
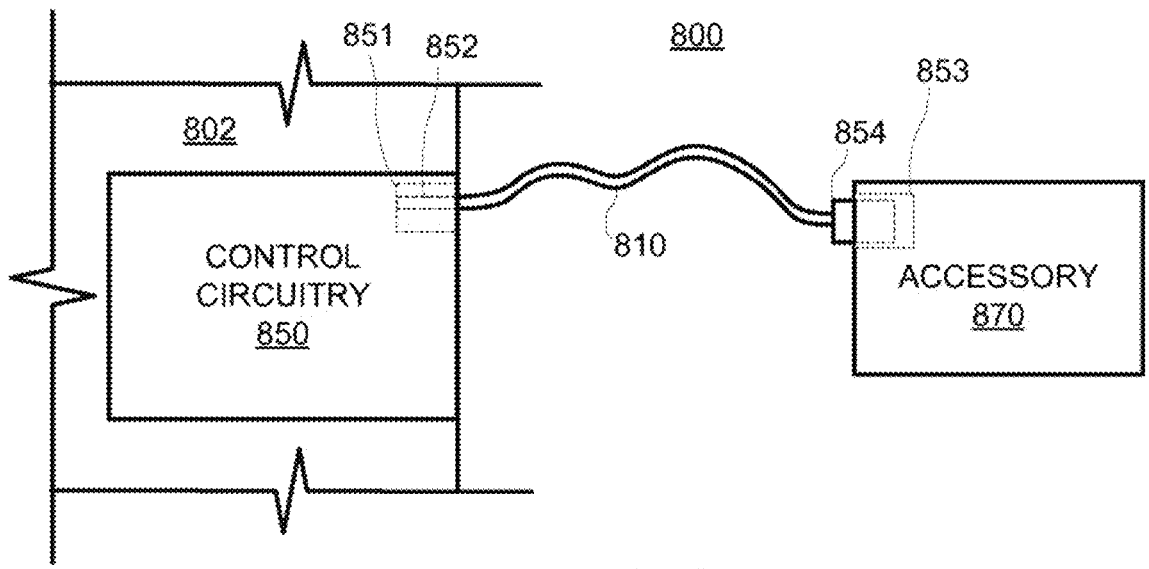
FIG. 8 shows a system diagram of an illustrative cable lock system, including an accessory, in accordance with some embodiments of the present disclosure.

FIG. 8 shows a system diagram of illustrative cable lock system 800, including accessory 870, in accordance with some embodiments of the present disclosure. Accessory 870 is configured to communicate with control circuitry 850, vehicle 802, or both. Cable 810 includes end connector 854 (i.e., one free end), configured to engage with port 853, which is integrated into accessory 870. Control circuitry 850, as illustrated, is integrated into vehicle 802. Cable 810 includes fixed end 852, which is not configured to be removed from vehicle 802, at least under normal operation. In some embodiments, port 851 (e.g., a home receptacle) may be configured to house connector 854 when cable 810 is not secured. In some such embodiments, port 851 is configured to detect whether connector 854 is housed in port 851 or not. For example, connector 854 may include one or more electrical terminals that may engage a corresponding electrical terminal of port 851. Similarly, port 853 of accessory 870 may include one or more electrical terminals configured to engage with the one or more electrical terminals of connector 854. In some embodiments, accessory 870 may include a wireless communications interface such as, for example, Bluetooth, WiFi, near-field communications (NFC), cellular network (e.g., 3G, 4G), any other suitable interface, or any combination thereof. In some embodiments, accessory 870 may include a wired communications interface such as, for example, a two-wire serial, a multi-wire serial interface, a plurality of input/output terminals (I/O), any other suitable interface, or any combination thereof. In an illustrative example, accessory 870 may communicate with vehicle 802 using a CANbus interface.

Figure 9:
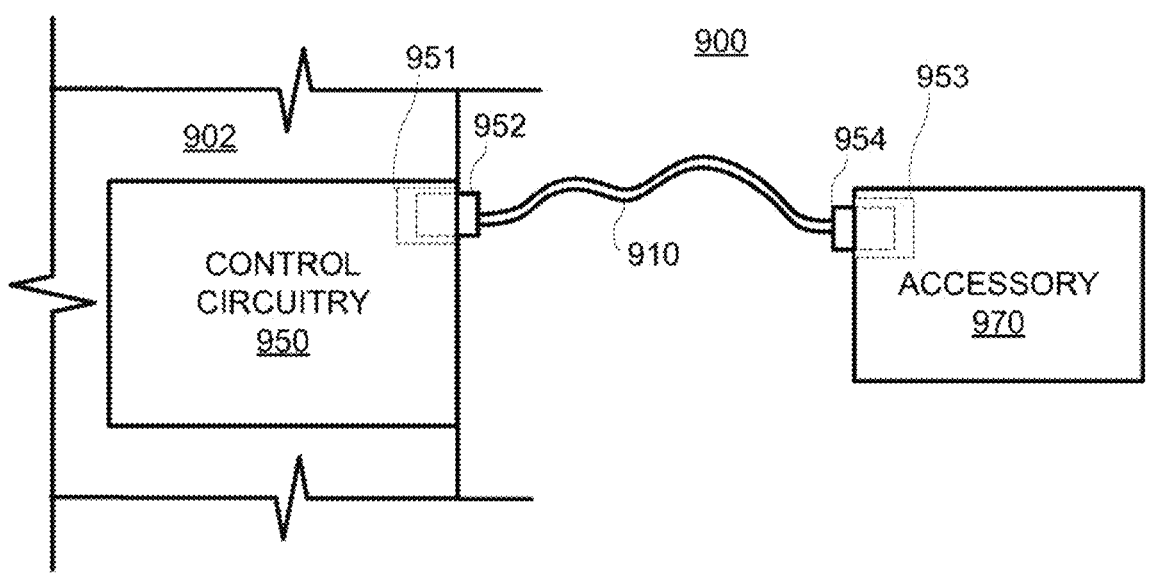
FIG. 9 shows a system diagram of an illustrative cable lock system, including an accessory, in accordance with some embodiments of the present disclosure.

FIG. 9 shows a system diagram of an illustrative cable lock system, including an accessory, in accordance with some embodiments of the present disclosure. Cable 910 includes end connectors 952 and 954, configured to engage with respective ports 951 and 953, which are coupled to control circuitry 950. Control circuitry 950, as illustrated, is integrated into vehicle 902. Cable lock system 900 may be stored separately from vehicle 902 and accessory 970, for example. In some embodiments, accessory 970 may include a wireless communications interface such as, for example, Bluetooth, WiFi, near-field communications (NFC), cellular network (e.g., 3G, 4G), any other suitable interface, or any combination thereof. In some embodiments, accessory 970 may include a wired communications interface such as, for example, a two-wire serial interface, a multi-wire serial interface, a plurality of input/output terminals (I/O), any other suitable interface, or any combination thereof. In an illustrative example, accessory 970 may communicate with vehicle 902 using a CANbus interface. In some embodiments, accessory 970 may include circuitry without processing equipment, and may rely on a relatively simple electrical circuit to communicate connector connection/disconnection, cable damage, or both.

Any of the illustrative cable lock systems of FIGS. 5-9 may be combined or modified, in accordance with the present disclosure. For example, an accessory may be used in concert with cable lock system 700, which may be configured to apply a small current to cable 710 for detection. The accessory may clip around cable 710, and be configured to sense current flow in cable 710 (e.g., a loop-type ammeter). Further, the accessory may include a communications interface configured to communicate with control circuitry 750 (e.g., for determining that current is flowing in the cable from one end to the other).

In some embodiments, a cable lock system (e.g., any of the illustrative cable lock systems of FIGS. 5-9) may include a connector having a power supply, control circuitry, or both. For example, a connector may include a battery coupled to two corresponding electrical terminals of the connector. A port may include two corresponding electrical terminals coupled to control circuitry and configured to contact the electrical terminals of the connector. When the connector is engaged with the port, the control circuitry may detect the voltage from the battery of the connector across the two electrical terminals, and accordingly may determine the connector is engaged. In some embodiments, a connector may include one or more indicator lights (e.g., LEDs) configured to indicate a state of the connector (e.g., secured, released, partially secured). In some embodiments, a connector includes a power supply and control circuitry, and generates a signal at two or more electrical terminals of the connector. Accordingly, when the connector is engaged to a port having corresponding electrical terminals, the cable lock system of the vehicle may detect the signal and determine that the connector is engaged with the port.

In some embodiments, the cable may be electrically conductive, and be grounded at the end away from the connector. In some embodiments, the cable may be electrically conductive, and be grounded at the port via contact with the connector (e.g., via a latch or other contacting engagement). In some embodiments, a fixed end of a cable may be electrically grounded to the vehicle (e.g., thus grounding the connector at the free end), and the cable lock system may include control circuitry configured to determine whether the grounded connector is engaged with a port. For example, the port may include a voltage sensor, which when the connector is engaged, contacts the connector housing and therefore senses 0V (i.e., vehicle ground in this example). In some embodiments, the port may include an electrical terminal that is "pulled-up" to 12V via a suitable pull-up resistor, and accordingly the control circuitry may measure 12V at the terminal. When a grounded connector is attached, the control circuitry may then measure 0V and determine that a connector is engaged.

In some embodiments, a connector, a port, or both, include a switch which is configured to change state (i.e., throw position) when the connector and port are engaged. For example, a port may include an off-on switch coupled to a circuit which may be monitored by control circuitry and when a connector is engaged, the control circuitry may detect the change in switch state. In a further example, a port may include a magnetic switch and the connector may include a magnet, and the magnetic switch may change state when the magnet is nearby (e.g., when the connector is engaged). Any suitable switch, configured to change state based on proximity, contact, or a mechanical throw may be used in accordance with the present disclosure.

Figure 10:
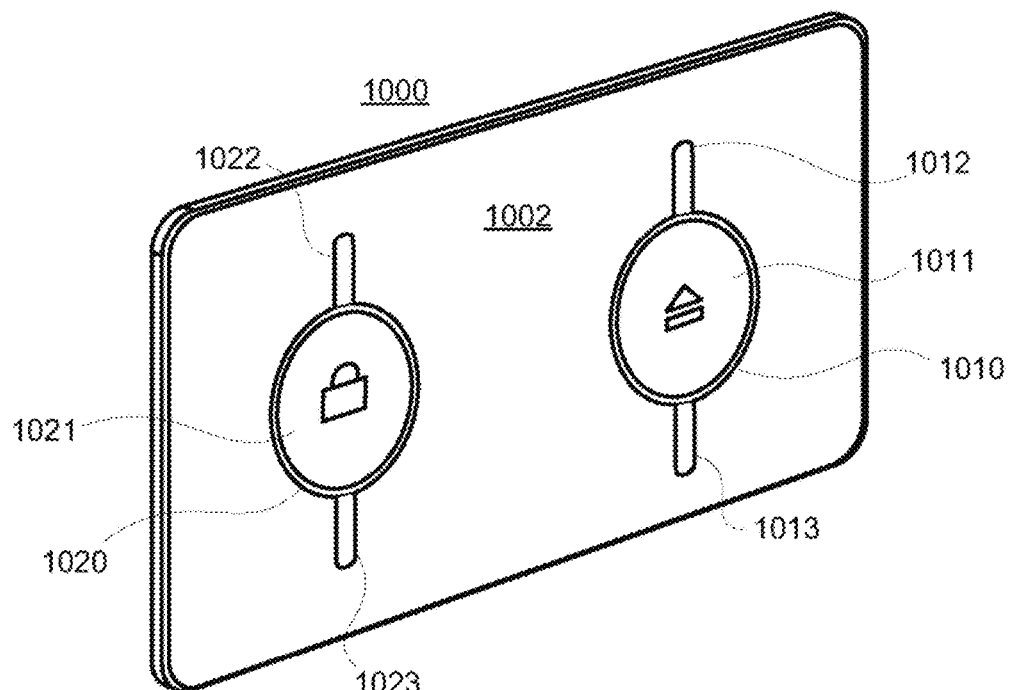
FIG. 10 shows a perspective view of an illustrative cable lock system, as stored during non-use, in accordance with some embodiments of the present disclosure.
Figure 11:
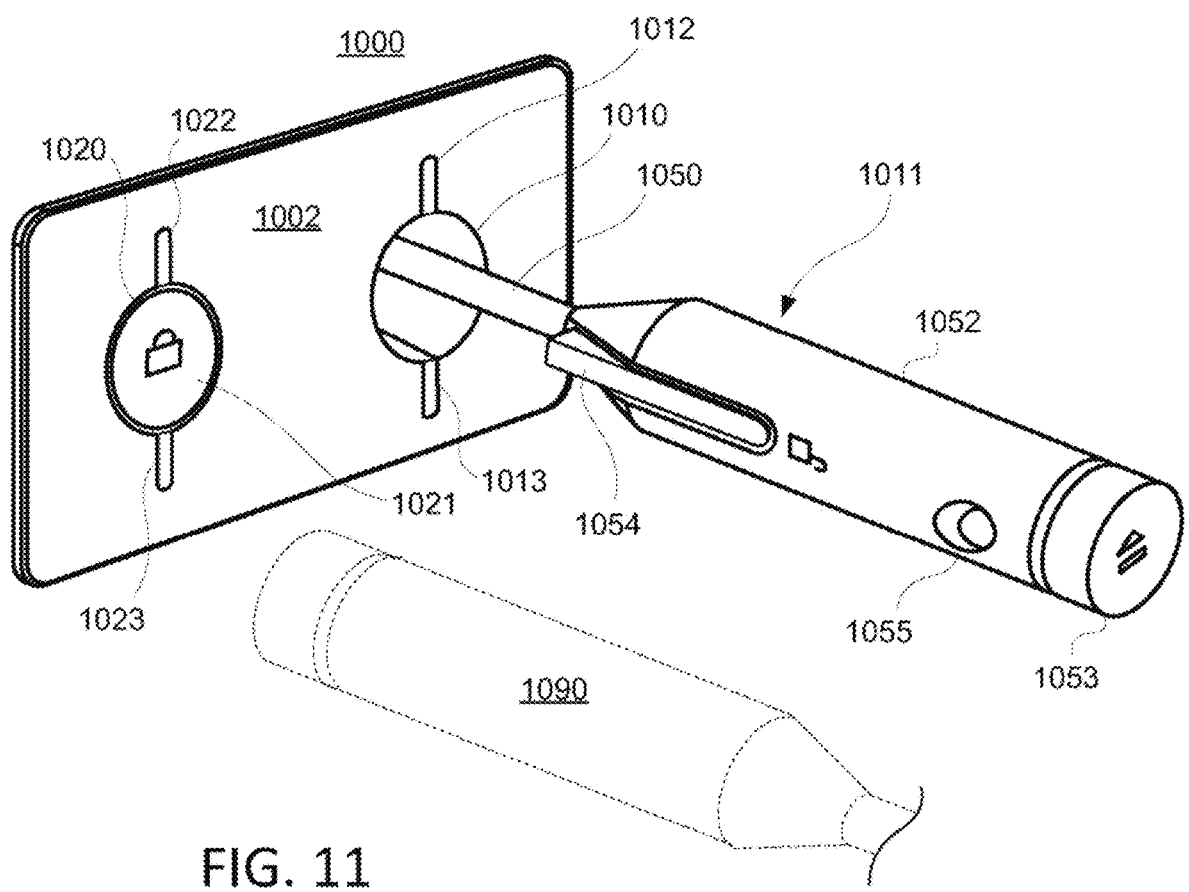
FIG. 11 shows a perspective view of the illustrative cable lock system of FIG. 10, with a connector removed, in accordance with some embodiments of the present disclosure.

FIG. 10 shows a perspective view of illustrative cable lock system 1000, as stored during non-use, in accordance with some embodiments of the present disclosure. For example, cable lock system 1000 may be integrated into a vehicle, similarly to illustrative cable lock system 120 of FIG. 1. FIG. 11 shows a perspective view of illustrative cable lock system 1000 of FIG. 10, with connector 1052 removed, in accordance with some embodiments of the present disclosure.

Cable lock system 1000 includes faceplate 1002, which includes integrated first port 1010 and second port 1020. In some embodiments, a faceplate may include indicators, or other components, in addition to ports. For example, as illustrated in FIGS. 10-11, indicators 1012 and 1013 correspond to first port 1010, and indicators 1022 and 1023 correspond to second port 1020.

Connector 1011 is arranged at an end of cable 1050, as shown in FIG. 11. As shown in FIG. 11, connector 1011 includes body 1052, feature 1055, latch 1053, and release 1054. In some embodiments, as illustrated in FIG. 11, feature 1055 may include a hole or other recess in body 1052 configured to accommodate a pin or other protrusion to lock connector 1011 in place. For example, first port 1010 may include a spring-loaded protrusion on its interior cylindrical surface that may extend into feature 1055 when connector 1011 is secured in first port 1010 (e.g., for storage or other non-use). Latch 1053 is used to release and remove connector 1011 from first port 1010. For example, referencing FIG. 10, latch 1053 may be flush with faceplate 1002, and when latch 1053 is pushed, the engagement between feature 1055 and the protrusion is released and connector 1011 may protrude from first port 1010 (e.g., similarly to the cam action of a click ballpoint pen).

Dashed illustration 1090 shows the orientation of connector 1011 when it is ready to be inserted in second port 1020 and secured (e.g., after being intertwined with equipment that is desired to be secured). For example, latch 1053 is inserted first into second port 1020, positioning it for securement. Second port 1020 may include a similar protrusion as first port 1010 for engaging with feature 1055 in body 1052 when connector 1011 is positioned in second port 1020. In some embodiments, release 1054 may protrude from second port 1020 (e.g., be accessible to a user) when connector 1011 is secured in second port 1020. Port cover 1021, arranged in second port 1020, as shown in FIGS. 10-11, is flush with faceplate 1002, when connector 1011 is not secured to second port 1020. When connector 1011 is inserted into second port 1020 for securement, port cover 1021 is thus pushed back into second port 1020. In some embodiments, latch 1053 includes an electrical terminal, and port cover 1021 includes a corresponding electrical terminal, which may be in electrical contact with each other when connector 1011 is secured in second port 1020.

Figure 12:
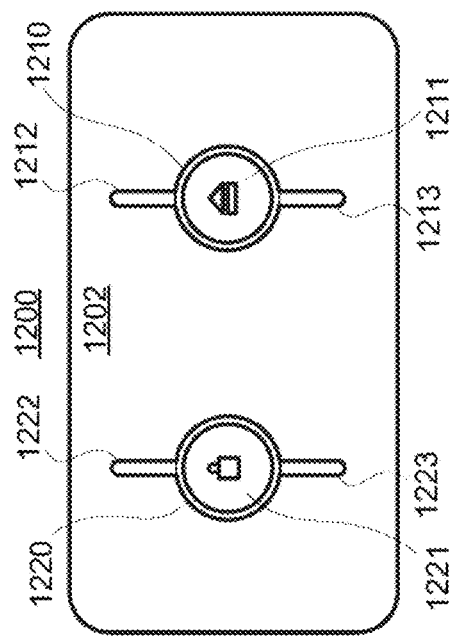
FIG. 12 shows a front view of an illustrative cable lock system, as stored during non-use, in accordance with some embodiments of the present disclosure.
Figure 13:
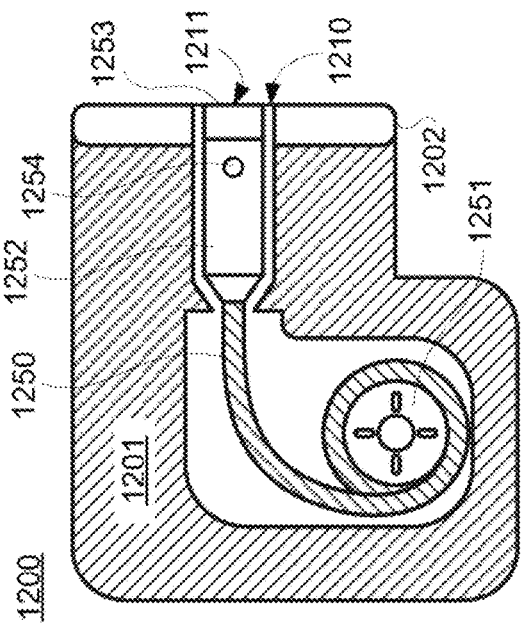
FIG. 13 shows a side cross-sectional view of an illustrative cable lock system of FIG. 12, as stored during non-use, in accordance with some embodiments of the present disclosure.
Figure 15:
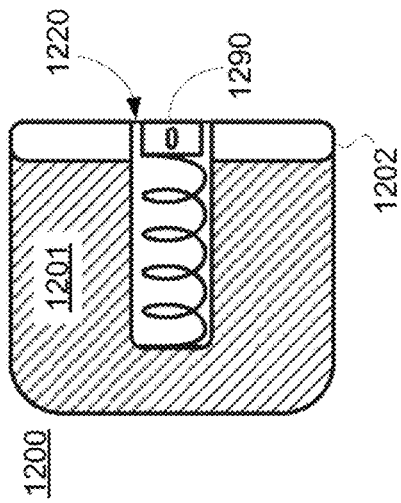
FIG. 15 shows a side cross-sectional view of the illustrative cable lock system of FIG. 12, as stored during non-use, in accordance with some embodiments of the present disclosure.
Figure 14:
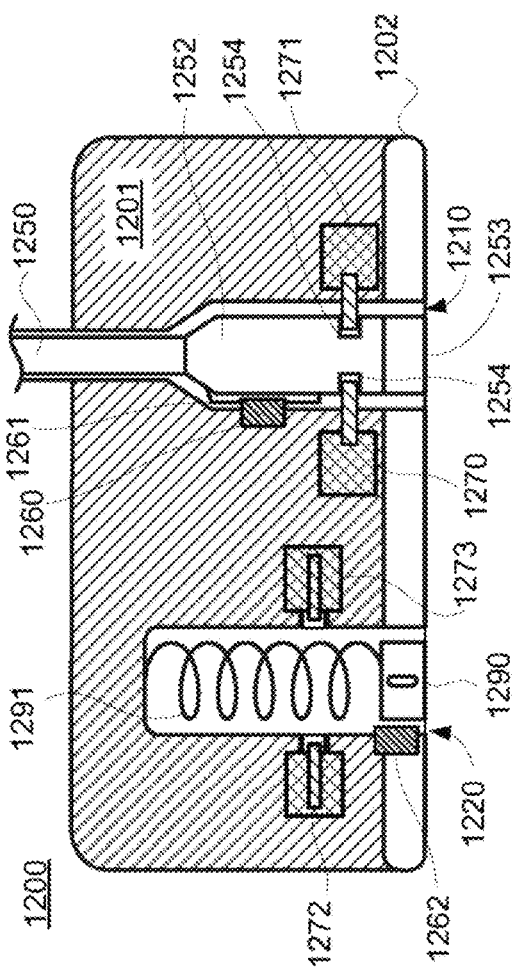
FIG. 14 shows a top cross-sectional view of the illustrative cable lock system of FIG. 12, as stored during non-use, in accordance with some embodiments of the present disclosure.
Figure 17:
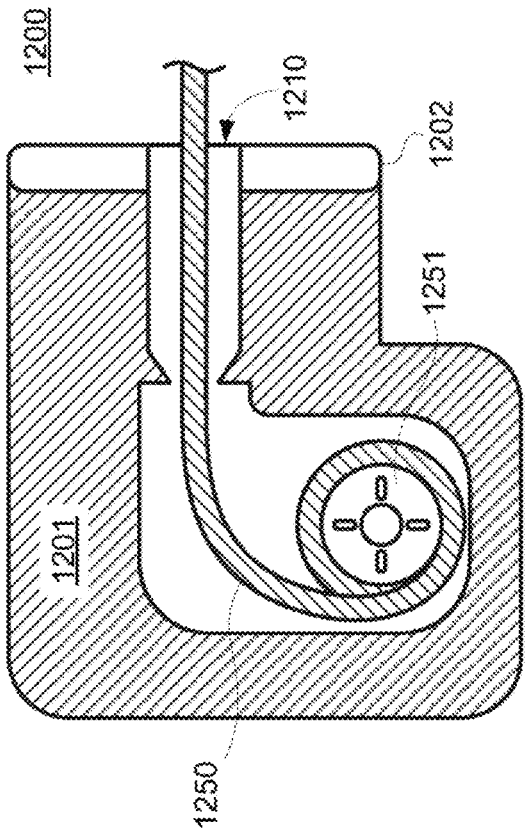
FIG. 17 shows a side cross-sectional view of the illustrative cable lock system of FIG. 12, in a secured state, in accordance with some embodiments of the present disclosure.
Figure 16:
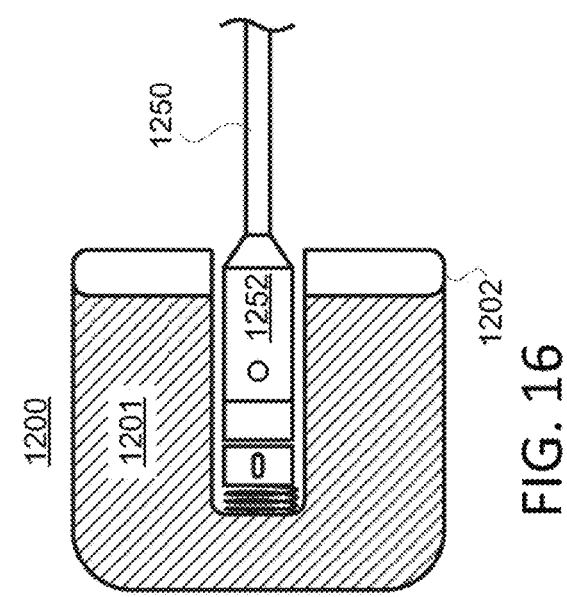
FIG. 16 shows a side cross-sectional view of the illustrative cable lock system of FIG. 12, in a secured state, in accordance with some embodiments of the present disclosure.
Figure 18:
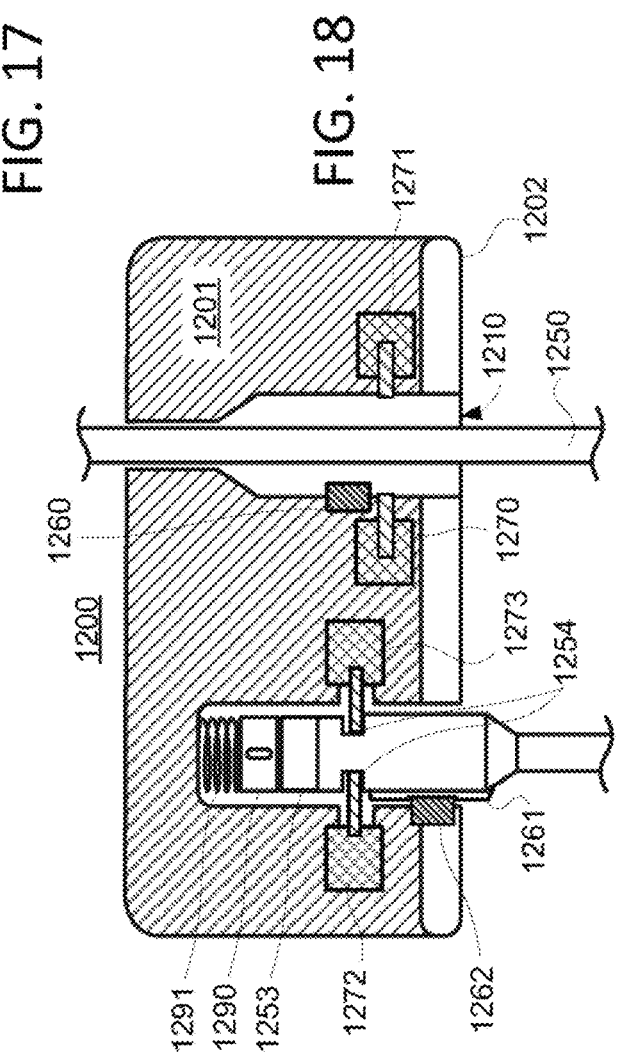
FIG. 18 shows a top cross-sectional view of the illustrative cable lock system of FIG. 12, in a secured state, in accordance with some embodiments of the present disclosure.

Cable lock system 1200, as illustrated in FIGS. 12-18, is similar to cable lock system 1000 of FIGS. 10-11, for example. It will be understood that some components and features of cable lock system 1200 are not visible in all views corresponding to FIGS. 12-18. FIG. 12 shows a front view of illustrative cable lock system 1200, as stored during non-use, in accordance with some embodiments of the present disclosure. FIG. 13 shows a side cross-sectional view of illustrative cable lock system 1200 of FIG. 12, as stored during non-use, in accordance with some embodiments of the present disclosure. FIG. 14 shows a top cross-sectional view of illustrative cable lock system 1200 of FIG. 12, as stored during non-use, in accordance with some embodiments of the present disclosure. FIG. 15 shows a side cross-sectional view of illustrative cable lock system 1200 of FIG. 12, as stored during non-use, in accordance with some embodiments of the present disclosure. FIG. 16 shows a side cross-sectional view of illustrative cable lock system 1200 of FIG. 12, in a secured state, in accordance with some embodiments of the present disclosure. FIG. 17 shows a side cross-sectional view of illustrative cable lock system 1200 of FIG. 12, in a secured state, in accordance with some embodiments of the present disclosure. FIG. 18 shows a top cross-sectional view of illustrative cable lock system 1200 of FIG. 12, in a secured state, in accordance with some embodiments of the present disclosure.

Cable lock system 1200 includes faceplate 1202, which includes integrated first port 1210 and second port 1220. For example, as illustrated in FIG. 12, indicators 1212 and 1213 correspond to first port 1210, and indicators 1222 and 1223 correspond to second port 1220. Structure 1201 is configured to house ports 1210 and 1220, control circuitry, and any other suitable components of a cable lock system. For example, structure 1201 may include a portion of a body panel of the vehicle, a portion of the frame of the vehicle, a stand-alone body rigidly affixed to the vehicle, or a suitable combination thereof.

Connector 1211 is arranged at an end of cable 1250, as shown in FIGS. 13, 14, 16 and 18. Connector 1211 includes body 1252, features 1254 configured to engage a latch, face 1253, and release 1261 coupled to a button of face 1253. Body 1201 includes powered latches 1270, 1271, 1272, and 1273 configured to engage/disengage features 1254 (e.g., holes as illustrated) and lock/release connector 1211. Body 1201 also includes catch 1262 configured to engage with release 1261. For example, release 1261 includes a recess that, when connector 1211 is secured (e.g., as illustratively shown in FIG. 18), engages with the portion of catch 1262 that protrudes into port 1220. Body 1201 also includes catch 1260 configured to engage with release 1261. For example, release 1261 includes a recess that, when connector 1211 is stored during non-use (e.g., as illustratively shown in FIG. 14), engages with the portion of catch 1260 that protrudes into port 1210. Face 1252 may include a push-button that, when pushed, releases release 1261 from catch 1260 (e.g., to remove connector 1211 from port 1210). Release 1261, when push radially inward while connector 1211 is secured (e.g., as shown in FIG. 18), releases from catch 1262 such that connector 1211 can be removed from port 1220. Accordingly, cable lock system 1200 includes both powered latches (e.g., latches 1270-1273) and manual latches (e.g., the engagement of release 1261 with either catch 1260 or 1262).

As illustrated in FIGS. 12-15, connector 1211 may be housed in port 1210 when not securing equipment. Cable 1250 is retracted on reel 1251 (i.e., a retractor), which acts as a spool (e.g., to take up cable length). Face 1253 is flush with faceplate 1202 when housed in port 1210, as illustrated. Face 1290, coupled to spring 1291, is arranged in port 1220 (e.g., and flush with faceplate 1202 as illustrated in FIGS. 12, 14, and 15). Power latches 1270 and 1271 include pins that engage features 1254, so that connector 1211 cannot be removed from port 1210. For example, if a use is not authorized, cable lock system 1200 may maintain the engagement of latches 1270 and 1271 to prevent unauthorized use. Release 1261 is engaged with catch 1260, providing a manual latch in addition to power latches 1270 and 1271.

To remove connector 1211 from port 1210, a user may (1) push a button in face 1253, which is coupled to release 1261, to free release 1261 from catch 1260, and (2) provide an authorized indication to release power latches 1270 and 1271. Steps (1) and (2) may be performed in any suitable order, in accordance with the present disclosure. For example, the user may first release the power latches, then push a button in face 1253 to free release 1261, and then remove connector 1211 along with some length of cable 1250 from port 1210.

After intertwining cable 1250 with equipment, the user may desire to secure the cable lock. Accordingly, the user would insert connector 1211, face 1253 first, into port 1220 until release 1261 catches on catch 1262, thus mechanically constraining connector 1211 in position (e.g., axial, radial, and azimuthal position). The user may also provide an indication to lock the cable lock to cable lock system 1200. Accordingly, cable lock system 1200 may cause pins of power latches 1272 and 1273 to engage features 1254 of connector 1211. Cable 1250 is now considered "secured," and the configuration may remain until the user desires to unlock the equipment.

As illustrated in FIGS. 16-18, connector 1211 may be interfaced to port 1220 and cable 1250 may be at least partially extended when securing equipment. Cable 1250 is at least partially extended from reel 1251, which may optionally apply an axial force, putting cable 1250 in tension. Face 1253 is now pushed against face 1290, as illustrated. Face 1290, coupled to now-compressed spring 1291, is now recessed axially into port 1220 (e.g., and no longer flush with faceplate 1202). Power latches 1272 and 1271 include pins that engage features 1254, so that connector 1211 cannot be removed from port 1220. For example, if a user is authorized, cable lock system 1200 may cause the engagement of latches 1272 and 1273 to prevent unauthorized release of the cable lock.

In some embodiments, connector 1211 includes one or more electrical terminals. For example, in some embodiments, features 1254 include one or more electrical terminals (e.g., arranged within the recesses). The pins of power latches 1270-1273 may also include respective electrical terminals configured to electrically contact the electrical terminals of features 1254 when the power latches are engaged. Accordingly, an electrical signal may be transmitted from connector 1211 to electrical terminals of power latches 1270-1273, which may be coupled to control circuitry of cable lock system 1200 (e.g., not shown in FIGS. 12-18). Thus, cable lock system 1200 may be configured to determine that connector 1211 is engaged with port 1210, engaged with port 1220, or not engaged to either of ports 1210 and 1220.

In some embodiments, one or more electrical terminals may be included in face 1253 and face 1290, which may be in electrical contact when connector 1211 is engaged in port 1220. Spring 1291 may be electrically coupled to face 1290 and control circuitry of cable system 1200. Accordingly, when connector 1211 is secured in port 1220, the control circuitry may be able to detect an electrical signal from the electrical terminal of face 1253. To illustrate, the electrical terminal of face 1253 may be coupled to an electrically conductive path along cable 1250 and to the control circuitry (e.g., configured to supply the electrical signal at the retracted end of cable 1250).

In some embodiments, reel 1251 may include a sensor coupled to control circuitry and configured to sense the length of cable 1250 that is extended. For example, in some embodiments, when secured, if the length of cable 1250 that is extended changes (e.g., reel 1251 is rotated from an axial force on cable 1250), control circuitry of cable control system 1200 may alert the user similar to the event that cable 1250 is cut (e.g., a signal is no longer detected).

Figure 19:
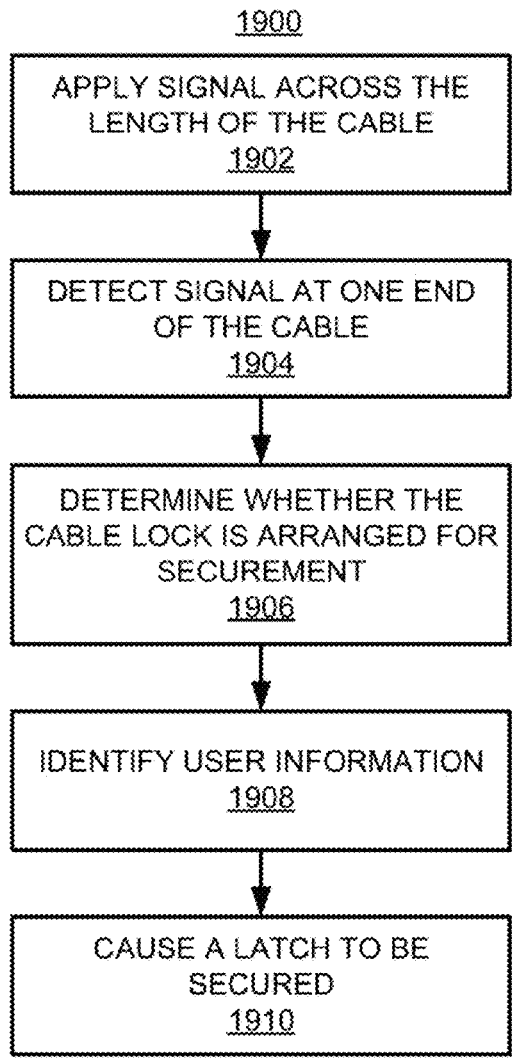
FIG. 19 shows a flowchart of an illustrative process for securing a cable lock, in accordance with some embodiments of the present disclosure.

FIG. 19 shows a flowchart of illustrative process 1900 for securing a cable lock, in accordance with some embodiments of the present disclosure. It should be noted that process 1900 or any step thereof could be performed by any of the illustrative cable lock systems shown in FIGS. 1-18. In addition, one or more steps of process 1900 may be incorporated into or combined with one or more steps of any other process or embodiment described herein. It is contemplated that the steps or descriptions of FIG. 19 may be used with any other embodiment of this disclosure. In addition, the steps and descriptions described in relation to FIG. 19 may be done in alternative orders or in parallel, in accordance with the present disclosure. Any of these steps may also be suitably skipped or omitted from performance of the process.

Step 1902 includes a control system applying a signal across the length of a cable, of a cable lock system. For example, the control system may apply the signal to one end of the cable. The signal may include, for example, a DC voltage (e.g., 12 VDC), a DC voltage with modulation, an AC voltage, a waveform (e.g., a 1 kHz square wave), a current, a binary signal (e.g., a digital signal protocol such as serial communication), an analog signal, any other suitable signal, or any combination thereof. In some embodiments, the signal, or "excitation," is applied at a predetermined frequency (e.g., although the signal itself may be without frequency content). In some embodiments, the signal, or "excitation," is applied continuously (e.g., the signal is always applied at one end of the cable). The control system may include control circuitry for managing the application of the signal to the end of the cable.

Step 1904 includes the control system detecting the signal at an end of the cable. For example, the control system may apply the signal to one end of the cable at step 1902, and detect the signal at the opposite end of the cable. The detected signal may include an attenuated, filtered, or otherwise modified vestige of the applied signal from step 1902. For example, if a voltage or current is applied at one end, a relatively reduced voltage or current may be detected at the other end due to impedance of the cable. Accordingly, the control system may be configured to detect one or more features of an electrical signal. For example, the control system may be configured to detect a voltage above a threshold, a current above a threshold, a frequency component (e.g., from a spectrum-based calculation), a leading or trailing edge of a pulse, any other suitable feature, or any combination thereof. To illustrate, the control system may include an analog-to-digital converter (ADC), a comparator, or other suitable circuitry to detect a signal.

Step 1906 includes the control system determining whether the cable lock is arranged for securement. In some embodiments, the cable includes a connector at an end of the cable, which may include one or more electrical terminals. In some such embodiments, the one or more electrical terminals may contact corresponding electrical terminals of a port only when the connector is fully seated, inserted, or otherwise connected. For example, the electrical terminals and corresponding electrical terminals may only line up and come in contact when the connector is fully inserted. In some embodiments, the control system determines whether the cable lock is arranged for securement based on the detected signal at step 1904. For example, if no signal is detected, the control system may determine that the cable is not arranged for securement. In a further example, if the cable's connector is secured but the cable is cut or otherwise damaged and no signal is detected, the control system may determine that the cable is not arranged for securement. In a further example, if a signal is detected, but is noisy, intermittent, or too strongly attenuated, the control system may determine that the cable is not arranged for securement. In a further example, if the control system detects a signal voltage above a predetermined threshold, then the control system may determine that the cable is arranged for securement.

Step 1908 includes the control system identifying user information. In some embodiments, when the control system has determined that the cable lock is arranged for securement, the control system requires user information before causing a latch to be secured (e.g., at step 1910). For example, a user may secure items and then insert a connector into a suitable port. If the user is not authorized, the control system will not cause the latch to be secured. For example, this prevents an unauthorized stranger or nefarious actor from securing equipment (e.g., an inconvenience for the authorized user). In some embodiments, the control system may include a communications interface configured to communicate with a user's mobile device (e.g., a smart phone, or a key fob). For example, the control system may prompt the user for a code. In a further example, the mobile device may include a software application configured to communicate with the control system, and the user may send an authorization to the control system. In a further example, the mobile device may include a key fob (e.g., the vehicle car alarm key fob), which may be recognized by the control system when in proximity, and the control system may accordingly identify the user. In some embodiments, the vehicle may include a keypad, touchscreen, or other user interface on the interior or exterior coupled to the control system. Accordingly, the control system may use the interface (e.g., via a software application, or use of push buttons) to prompt the user for authorization or identification.

Step 1910 includes the control system causing a latch to be secured. The control system may perform step 1910 in response to identifying user information at step 1908. For example, the control system may identify a nearby key fob, determine that the key fob is authorized, and then perform step 1910. In some embodiments, causing the latch to be secured includes, for example, applying voltage to a relay, closing an electrical circuit, generating a signal, applying electrical power to the latch, any other action which secures the latch, or any combination thereof.

In an illustrative example, a user may have a smartphone application configured to communicate with the control system, and the user may desire to secure a mountain bike. The control system may apply 12 VDC at one end of a cable, affixed to a retractor. The user may unspool some length of cable to intertwine the cable with the bike, and insert the connector into a suitable port. The control system may detect the 12 VDC at the port from electrical contact between electrical terminals of the connector and the port. In response to detecting the 12 VDC, the control system may determine that the cable is arranged for securement. The user may open the software application and select an option to secure. The mobile device may send a signal to the control system (e.g., using 4G wireless), indicating the user's identity and an indication to secure. Lastly, the control system may receive the indication, and in response, activate an electromechanical solenoid via a relay to secure the connector in the port. Accordingly, the mountain bike is now locked, and the control system may optionally monitor the cable (e.g., via the detected signal) to ensure the mountain bike remains secured (e.g., some steps of process 1900 may be repeated even if the equipment is already secured).

Figure 20:
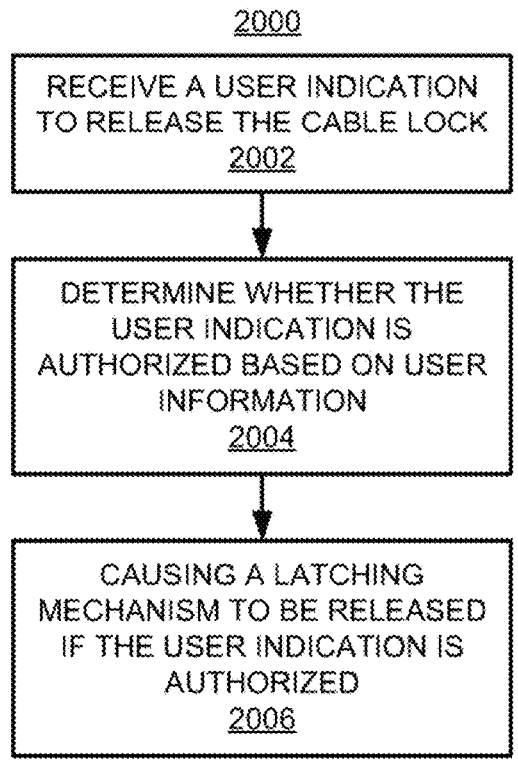
FIG. 20 shows a flowchart of an illustrative process for releasing a cable lock, in accordance with some embodiments of the present disclosure.

FIG. 20 shows a flowchart of illustrative process 2000 for releasing a cable lock, in accordance with some embodiments of the present disclosure. It should be noted that process 2000 or any step thereof could be performed by any of the illustrative cable lock systems shown in FIGS. 1-18. In addition, one or more steps of process 2000 may be incorporated into or combined with one or more steps of any other process or embodiment described herein. It is contemplated that the steps or descriptions of FIG. 20 may be used with any other embodiment of this disclosure. In addition, the steps and descriptions described in relation to FIG. 20 may be done in alternative orders or in parallel, in accordance with the present disclosure. Any of these steps may also be suitably skipped or omitted from performance of the process.

Step 2002 includes a control system receiving a user indication to release the cable lock. For example, the control system may perform step 2002 when equipment is already secured. In some embodiments, the control system may receive a user indication to release the cable lock. For example, a user may provide the indication to release the cable lock via a software application of a mobile device in communication with the control system. In some embodiments, the vehicle may include a keypad, touchscreen, a button, or other user interface on the interior or exterior coupled to the control system. The control system may receive the indication via the interface from the user.

Step 2004 includes the control system determining whether the user indication is authorized based on user information. In some embodiments, the control system identifies the user based on a code, a RFID tag (e.g., of a key fob, or other device), location of the user (e.g., relative to the vehicle), any other suitable criterion, or any combination thereof. In some embodiments, step 2004 may be combined with step 2002. For example, the software application on the user's mobile device may determine authorization before sending the indication to the control system. In some embodiments, step 2004 includes the control system determining that the user indication is not authorized (e.g., the user is not identifiable, or is identified but unauthorized), and not proceeding to step 2006.

Step 2006 includes the control system causing the latch mechanism to be released, if it is determined at step 2004 that the user indication is authorized. The control system may perform step 2006 in response to step 2004. For example, the control system may receive a user indication from a nearby key fob, determine that the indication is authorized, and then perform step 2006. In some embodiments, causing the latch to be released includes, for example, applying voltage to a relay, closing an electrical circuit, generating a signal, applying electrical power to the latch, any other action that releases the latch, or any combination thereof.

Figure 21:
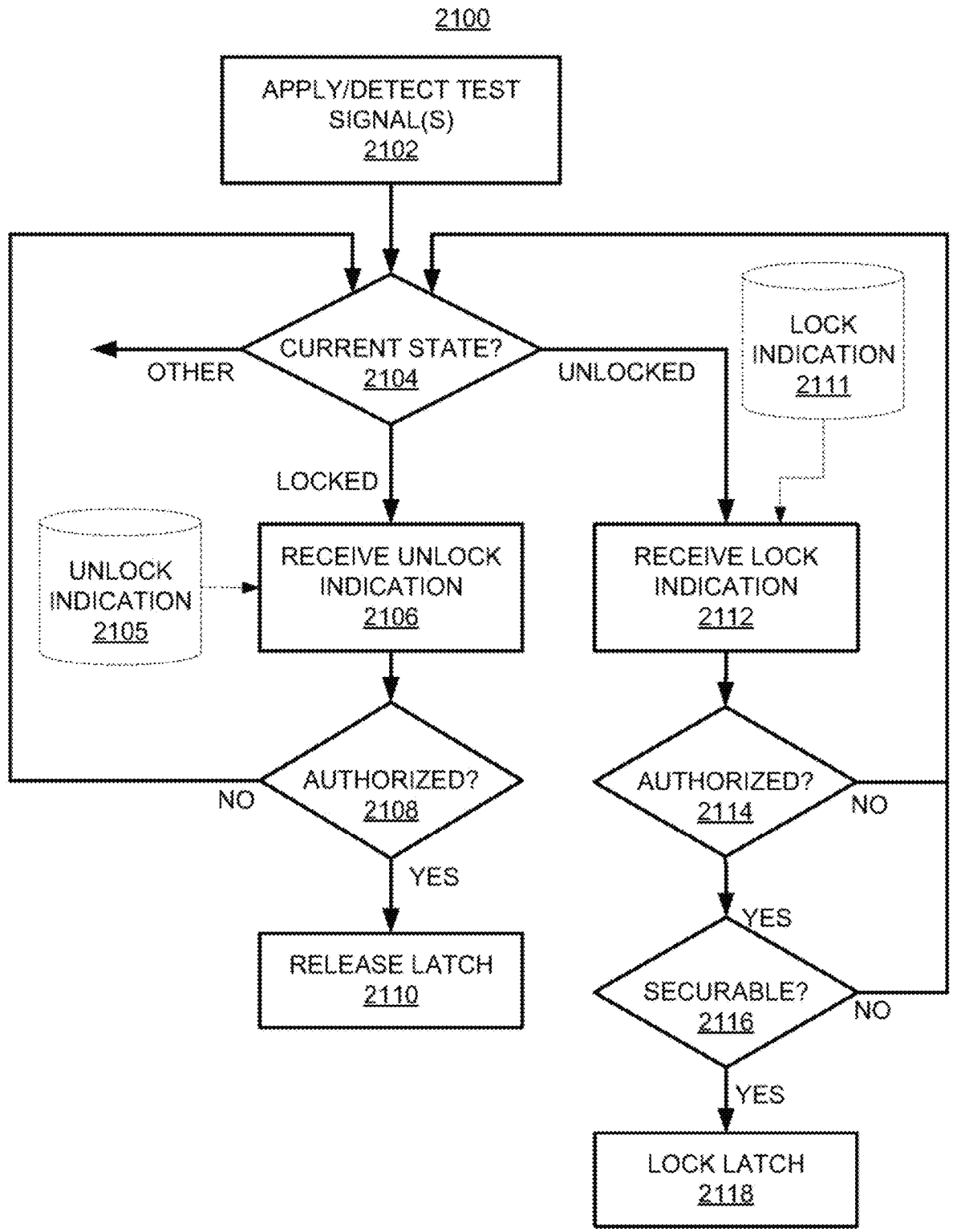
FIG. 21 shows a flowchart of an illustrative process for managing a cable lock, in accordance with some embodiments of the present disclosure.

FIG. 21 shows a flowchart of illustrative process 2100 for managing a cable lock, in accordance with some embodiments of the present disclosure. It should be noted that process 2100 or any step thereof could be performed by any of the illustrative cable lock systems shown in FIGS. 1-18. In addition, one or more steps of process 2100 may be incorporated into or combined with one or more steps of any other process or embodiment described herein. It is contemplated that the steps or descriptions of FIG. 21 may be used with any other embodiment of this disclosure. In addition, the steps and descriptions described in relation to FIG. 21 may be done in alternative orders or in parallel, in accordance with the present disclosure. Any of these steps may also be suitably skipped or omitted from performance of the process.

Step 2102 includes a control system applying one or more test signals to a cable, detecting one or more test signals at an end of the cable, or both. For example, step 2102 may include any of the illustrative processes of steps 1902 and 1904 of FIG. 19. In some embodiments, step 2102 includes the control system applying the signal to one end of the cable. The signal may include, for example, a DC voltage, a DC voltage with modulation, an AC voltage, a waveform, a current, a binary signal, an analog signal, any other suitable signal, or any combination thereof. In some embodiments, the signal, or "excitation," is applied at a predetermined frequency (e.g., although the signal itself may be without frequency content). In some embodiments, the signal, or "excitation," is applied continuously (e.g., the signal is always applied at one end of the cable). For example, one end of a cable may be grounded always, and accordingly the test signal is a constant 0V. The control system may include control circuitry for managing the application of the signal to the end of the cable. In some embodiments, the control system is configured to detect the signal at an end of the cable. For example, the control system may apply the signal to one end of the cable, and detect the signal at the opposite end of the cable. The detected signal may include an attenuated, filtered, or otherwise modified vestige of the applied signal. For example, if a voltage or current is applied at one end, a relatively reduced voltage or current may be detected at the other end due to impedance of the cable. In a further example, if a voltage waveform is applied at one end of the cable, a filtered version (e.g., due to the frequency response of an impedance) of the waveform may be detected at the opposite end. Accordingly, the control system may be configured to detect one or more features of an electrical signal. For example, the control system may be configured to detect a voltage above a threshold, a current above a threshold, a frequency component, a leading or trailing edge of a pulse, any other suitable feature, or any combination thereof. To illustrate, the control system may include an ADC, a comparator, or other suitable circuitry to detect a signal.

In some embodiments, step 2102 may include a control system applying a test signal and then determine an impedance (e.g., a resistance). For example, in some embodiments, the control system is configured to apply a voltage across the cable, and determine a resulting current flow through the cable to determine the effective resistance of the cable (e.g., via Ohm's law). A test signal may include any suitable electrical perturbation that may be detected, in accordance with some embodiments of the present disclosure.

Step 2104 includes a control system determining a current state of a cable lock. In some embodiments, the control system applies one or more test signals at step 2102. For example, based on detection of the test signal, or an attenuated version thereof, the control system may determine the cable is intact and secured. States of the cable lock system may include, for example, "secured" (e.g., a test signal is detected), "released" (e.g., no test signal is detected), "standby" (e.g., the connector is stored in a port for housing when not in use), "unsecurable" (e.g., cable damage detected, less-than-full engagement of a connector), "unreleasable" (e.g., unauthorized indication received), any other suitable state, or any combination thereof. In some embodiments, step 2104 may include aspects of step 1906 of FIG. 19, such as determining whether the cable lock is arranged for securement. In some embodiments, the cable includes a connector at an end of the cable, which may include one or more electrical terminals. In some such embodiments, the one or more electrical terminals may contact corresponding electrical terminals of a port only when the connector is fully seated, inserted, or otherwise connected. For example, the electrical terminals and corresponding electrical terminals may only line up and come in contact when the connector is fully inserted. In some embodiments, the control system determines whether the cable lock is arranged for securement based on the detected signal at step 2104. For example, if no signal is detected, the control system may determine that the cable is not arranged for securement. In a further example, if the cable's connector is secured but the cable is cut or otherwise damaged and no signal is detected, the control system may determine that the cable is not arranged for securement. In a further example, if a signal is detected, but is noisy, intermittent, or too strongly attenuated, the control system may determine that the cable is not arranged for securement. In a further example, if the control system detects a signal voltage above a predetermined threshold, then the control system may determine that the cable is arranged for securement.

If, at step 2104, it is determined that the cable lock system is currently in a locked state (e.g., secured), the control system may continue to monitor the cable (e.g., by detecting the test signal). At some point (e.g., after returning to the vehicle), an indication to unlock may be provided by the user to the control system. Step 2106 includes the control system receiving an indication to unlock the cable lock system. For example, step 2106 may include any suitable aspect of illustrative step 2002 of FIG. 20. The indication to unlock may include a user indication. For example, a user may indicate via a keypad, mobile device, or other interface that the cable lock should be unlocked. In some embodiments, the indication to unlock may come from a user via a user device (e.g., unlock indication 2105). In some embodiments, the indication may come from a user using a keypad, touchscreen, button, or other suitable interface of the vehicle.

Step 2108 includes the control system determining whether the indication to unlock is authorized. For example, after an indication to unlock the cable lock is received, the control system may wait to authorize the request before causing a latch to be released at step 2110. For example, step 2108 may include any suitable aspect of illustrative step 2004 of FIG. 20. In some embodiments, the control system identifies the user based on a code, a RFID tag of a device, any other suitable criterion, or any combination thereof. In some embodiments, step 2108 may be combined with step 2106. For example, the software application on the user's mobile device may determine authorization before sending the indication to the control system. In some embodiments, step 2108 includes the control system determining that the user indication is not authorized (e.g., the user is not identifiable, or is identified but unauthorized), and not proceeding to step 2110.

In some embodiments, step 2108 may include the control system determining a location of the vehicle (e.g., via an on-board GPS), the user (e.g., via a key fob or mobile device), or both to determine authorization. For example, the control system may determine that an authorized key fob is within range (e.g., is detected), and that the indication is authorized. In a further example, the control system may determine that the vehicle is located at the user's residence (e.g., in a garage), and accordingly may always authorize indications received at this location. In a further example, the control system may determine that for any location that is not the user's residence (e.g., a mall parking lot, or any location that is not pre-authorized), authorization is required from a nearby key fob, user identification, user input, or other suitable authorization criterion. In some embodiments, the extent and type of authorization may be based on the location of the vehicle, the user, or both. For example, if the user is nearby (e.g., a key fob is detected), the control system may require no further authorization. Further, if the vehicle at or nearby the user's home or other reference location, the control system may require no further authorization. In a further example, if a key fob is not detected, or the vehicle is located away from an authorized location, the control system may require further authorization (e.g., a passcode, an identifier, or other user input).

Step 2110 includes the control system causing the latch to be released. For example, step 2108 may include any suitable aspect of illustrative step 2006 of FIG. 20. In some embodiments, the control system may perform step 2110 in response to determining the indication is authorized at step 2108 and determining the cable lock is in a locked state at step 2104. In some embodiments, releasing the latch includes, for example, applying voltage to a relay, closing an electrical circuit, generating a signal, applying electrical power to the latch, any other action which releases the latch, or any combination thereof. After performing step 2110, the control system may enter a new state (e.g., "released" or in "standby" awaiting further indications). In some embodiments, after step 2110, the control system proceeds to step 2102 to monitor the ports for detected signals. For example, the control system may monitor ports (e.g., to detect a signal) until detecting a connector (e.g., via a detected signal), receiving an indication to lock, or some other suitable event occurs.

If, at step 2104, it is determined that the cable lock system is currently in an unlocked state (e.g., released), the control system may continue to monitor a port (e.g., by attempting to detect a test signal). At some point (e.g., after loading equipment into the vehicle), an indication to lock may be provided by the user to the control system. Step 2112 includes the control system receiving an indication to lock the cable lock. The indication to lock may include a user indication. For example, a user may indicate via a keypad, mobile device, or other interface that the cable lock should be locked. In some embodiments, the indication to lock may come from a user via a user device (e.g., lock indication 2111). In some embodiments, the indication may come from a user using a keypad, touchscreen, or other suitable interface of the vehicle.

Step 2114 includes the control system determining whether the indication to lock is authorized. For example, after an indication to lock the cable lock is received, the control system may wait to authorize the request before causing a latch to be secured at step 2118. For example, step 2114 may include any suitable aspect of illustrative step 2108. In some embodiments, the control system identifies the user based on a code, a RFID tag of a device, any other suitable criterion, or any combination thereof. In some embodiments, step 2114 may be combined with step 2112. For example, the software application on the user's mobile device may determine authorization before sending the indication to the control system. In some embodiments, step 2114 includes the control system determining that the user indication is not authorized (e.g., the user is not identifiable, or is identified but unauthorized), and not proceeding to step 2116 or 2118 (e.g., and optionally returning to another step such as step 2104).

Step 2116 includes the control system determining whether the cable lock is securable. In some embodiments, the control system determines whether the cable lock is securable by determining a state. In some embodiments, the control system determines whether the cable lock is securable in response to receiving the indication to lock at step 2112, determining the indication is authorized at step 2114, or both. Determining whether the cable lock is securable may include determining whether the cable is intact (e.g., a test signal propagates across the cable), the connector is engaged in a port (e.g., one or more electrical terminals are electrically coupled), determining a property of a detected signal (e.g., the presence or absence of noise, attenuation, or intermittency), any other criterion, or any combination thereof. In some embodiments, step 2116 includes the control system determining that the cable lock is not securable (e.g., cable damaged or connector not engaged), and not proceeding to step 2118 (e.g., and optionally returning to another step such as step 2104).

Step 2118 includes the control system causing the latch to be secured. For example, step 2118 may include any suitable aspects of illustrative step 1910 of FIG. 19. The control system may perform step 2118 in response to determining the indication is authorized at step 2114 and determining the cable lock is securable at step 2116. In some embodiments, locking the latch includes, for example, applying voltage to a relay, closing an electrical circuit, generating a signal, applying electrical power to the latch, any other action which secures the latch, or any combination thereof. After performing step 2118, the control system may enter a new state (e.g., "secured" or in "standby" awaiting further indications). In some embodiments, after step 2118, the control system proceeds to step 2102 to monitor the cable while secured. For example, at step 2104, the control system may determine the state is "damaged" (e.g., included in "other" in FIG. 2100) if no signal is detected at some time. In a further example, the control system may monitor the cable lock (e.g., detect the signal) until receiving an indication to unlock, detecting damage to the cable, or some other suitable event occurs.

In an illustrative example of process 2100, a user may desire to secure a surfboard with a cable lock. The surfboard may include a fin box, and an accessory may be configured to engage the fin box (e.g., having an interface similar to a removable fin). The accessory may be configured to communicate with the vehicle. The cable may include two conductors, and one end may be affixed to a retractor. The control system may apply 12 VDC at the retractor end of a first conductor of the cable, and be configured to detect voltage at the retractor end of the other conductor (i.e., the second conductor). The user may unspool some length of cable and insert the connector, having at least one electrical terminal per conductor, into a suitable port of the accessory. The port may include two electrical terminals configured to electrically couple the two conductors together, such that they form a series, contiguous conductor. Accordingly, the control system may detect the 12 VDC at the retractor end of the second conductor. In response to detecting 12 VDC across the cable, the control system may determine that the cable is arranged for securement. The user may select an option on a touchscreen of the vehicle dash to secure. The control system may receive the indication, and in response, communicate to the accessory to activate an electromechanical latch via a relay to secure the connector in the port of the accessory. Accordingly, the surfboard is now locked, and the control system may optionally monitor the cable (e.g., via the detected signal) to ensure the surfboard remains secured. In some embodiments, the accessory may include circuitry configured to detect whether it is engaged with the fin box. For example, the accessory may include a switch that is in an opened or closed state depending on whether the accessory is coupled to the fin box. Further, the accessory may electrically couple the two conductors of the cable together only if the accessory is coupled to the fin box.

In a further illustrative example of process 2100, a user may desire to secure a surfboard with a cable lock. The surfboard may include a fin box, and an accessory may be configured to engage the fin box (e.g., having an interface similar to a removable fin). The accessory may be configured to communicate with the vehicle. The cable may include two conductors, and one end may be affixed to a retractor. The cable may include two conductors and the control system may be configured to power the accessory by applying 12V to the retractor end of one conductor, and 0V at the retractor end of the other conductor. The user may unspool some length of cable and insert the connector, having at least one electrical terminal per conductor, into a suitable port of the accessory. The port may include two electrical terminals configured to electrically couple with the respective conductors, such that the accessory is powered by the 12V across the conductors. The accessory may detect the 12V and communicate wirelessly to the control system of the vehicle that the cable is engaged. Further the control system may communicate to the accessory to secure a powered latch of the assessor to secure the connector.

In some embodiments, at step 2104, the control system may determine the current state to be other than locked or unlocked. For example, the control system may determine that the state of the cable lock is "compromised" (e.g., damaged, destroyed, tampered with, or otherwise indicating a problem). In some embodiments, the control system responds to such a determination by alerting 9-1-1 (e.g., via a cellular network such as 4G), alerting some other responder (e.g., a private security response via a WiFi indication), alerting the user (e.g., via a text message, or other message sent to a mobile device), sound an alarm (e.g., the existing vehicle security alarm), providing any other suitable indication of the problem, or any combination thereof. For example, if a person attempts to disengage a secured connector without first providing an authorized indication, the control system may provide an indication to the authorized user (e.g., the vehicle owner, or an owner of an authorized mobile device).

Figure 22:
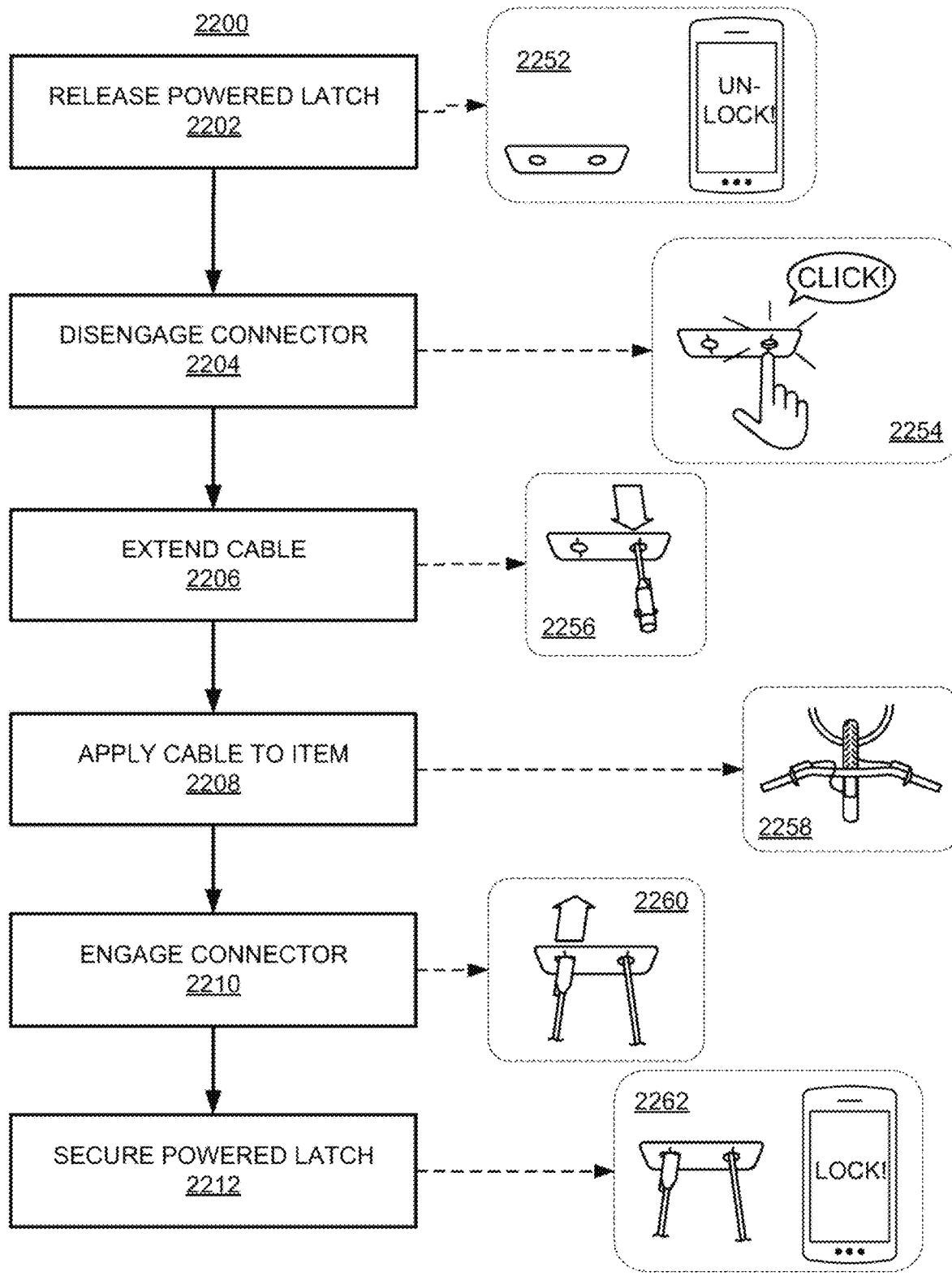
FIG. 22 shows a flowchart of an illustrative process for using a cable lock, in accordance with some embodiments of the present disclosure.

FIG. 22 shows a flowchart of illustrative process 2200 for using a cable lock, in accordance with some embodiments of the present disclosure. It should be noted that process 2100 or any step thereof could be performed by a user of the illustrative cable lock systems shown in FIGS. 1-18. In addition, one or more steps of process 2200 may be incorporated into or combined with one or more steps of any other process or embodiment described herein. It is contemplated that the steps or descriptions of FIG. 22 may be used with any other embodiment of this disclosure. In addition, the steps and descriptions described in relation to FIG. 22 may be performed by the user in alternative orders or in parallel, in accordance with some embodiments of the present disclosure. Any of these steps may also be suitably skipped or omitted from performance of process 2200. The illustrative steps of process 2200 are described in terms of a user securing a previously unsecured item.

Step 2202 includes a user releasing a powered latch. In some embodiments, the user releases the powered latch by providing an indication to a keypad, touchscreen, application of a mobile device, a key fob, and other suitable user interface, or any combination thereof. For example, panel 2252 shows two ports of a cable lock system similar to illustrative cable lock system 1000 of FIGS. 10-11. Panel 2252 also shows a user's mobile device, to which the user may provide the indication to release the powered latch. The mobile device is configured to communicate with the control system of the vehicle.

Step 2204 includes the user disengaging a connector arranged at the end of a cable. In some embodiments, the user may disengage a manual latch that is separate from the powered latch. In some embodiments, the user may disengage a manual latch that is integrated with the powered latch. For example, the connector may include a manual latch that becomes locked in the secured state by the power latch (e.g., a pin or other mechanical feature that blocks disengagement of the latch). In some embodiments, the powered latch may include a cinching latch, and the manual latch may include a detent position of the cinching latch. For example, panel 2254 shows a cable lock system similar to illustrative cable lock system 1000 of FIGS. 10-11. The cable includes a connector at the free end. Panel 2254 also shows a user releasing a manual latch to disengage the connector and hence the cable from a first port. The user presses in the latching mechanism of panel 2254, and the connector pops out via spring-loading so that the user can grab the connector. In some embodiments, step 2204 and step 2202 may be combined, or step 2202 may be omitted. For example, the user may be near the vehicle and a key fob may be detected. Accordingly, the cable lock system may release the powered latch automatically in response to the detection (e.g., so that the user can simply disengage the connector).

Step 2206 includes the user extending at least some length of cable. In some embodiments, the cable is coiled in a compartment, and the user removes the entire length of cable. In some embodiments, the cable may be affixed to a retractor, which manages the cable length. For example, panel 2256 shows a cable lock system similar to illustrative cable lock system 1000 of FIGS. 10-11. Panel 2256 also shows a length of cable extended.

Step 2208 includes the user applying the cable to an item. In some embodiments, the user may intertwine the cable with the item to prepare the item for securement. For example, panel 2258 shows a cable lock system similar to illustrative cable lock system 1000 of FIGS. 10-11. Panel 2258 also shows a length of cable extended and intertwined with a bicycle tire.

Step 2210 includes the user engaging the connector with a port. In some embodiments, the connector is engaged with a second port on the vehicle. A second latching mechanism is included in the second port. For example, panel 2260 shows a cable lock system similar to illustrative cable lock system 1000 of FIGS. 10-11. Panel 2260 also shows a connector of the cable being engage with the second port, after application to the item.

Step 2212 includes the user securing a powered latch. In some embodiments, the user may secure a powered latch by providing an indication to a keypad, touchscreen, application of a mobile device, a key fob, and other suitable user interface, or any combination thereof. For example, panel 2262 shows a cable lock system similar to illustrative cable lock system 1000 of FIGS. 10-11. Panel 2262 also shows a user's mobile device to which the user may provide the indication to secure the powered latch. The mobile device is configured to communicate with the control system of the vehicle. To illustrate, the user can now leave the vehicle because the bike is secured. The control system may continue to monitor the cable lock system by applying and detecting a signal across the cable while secured. In the event that the cable becomes damaged or unsecured, the control system may alert the user's mobile device, sound a vehicle alarm, or provide some other indication that the system is no longer secured. To unlock the bicycle, the user may work backwards through process 2200 by releasing the powered latch, disengaging the connector from the second port, freeing the cable from the item, retracting the cable, engaging the connector in the first port, and securing the powered latch of the first port.

In some embodiments, step 2210 and step 2212 may be combined, or step 2212 may be omitted. For example, when the user leaves the vicinity of the vehicle, the vehicle may no longer detect a key fob. Accordingly, the cable lock system may secure the powered latch automatically in response to not detecting the key fob (e.g., so that the user can simply walk away after step 2210).

Figure 23:
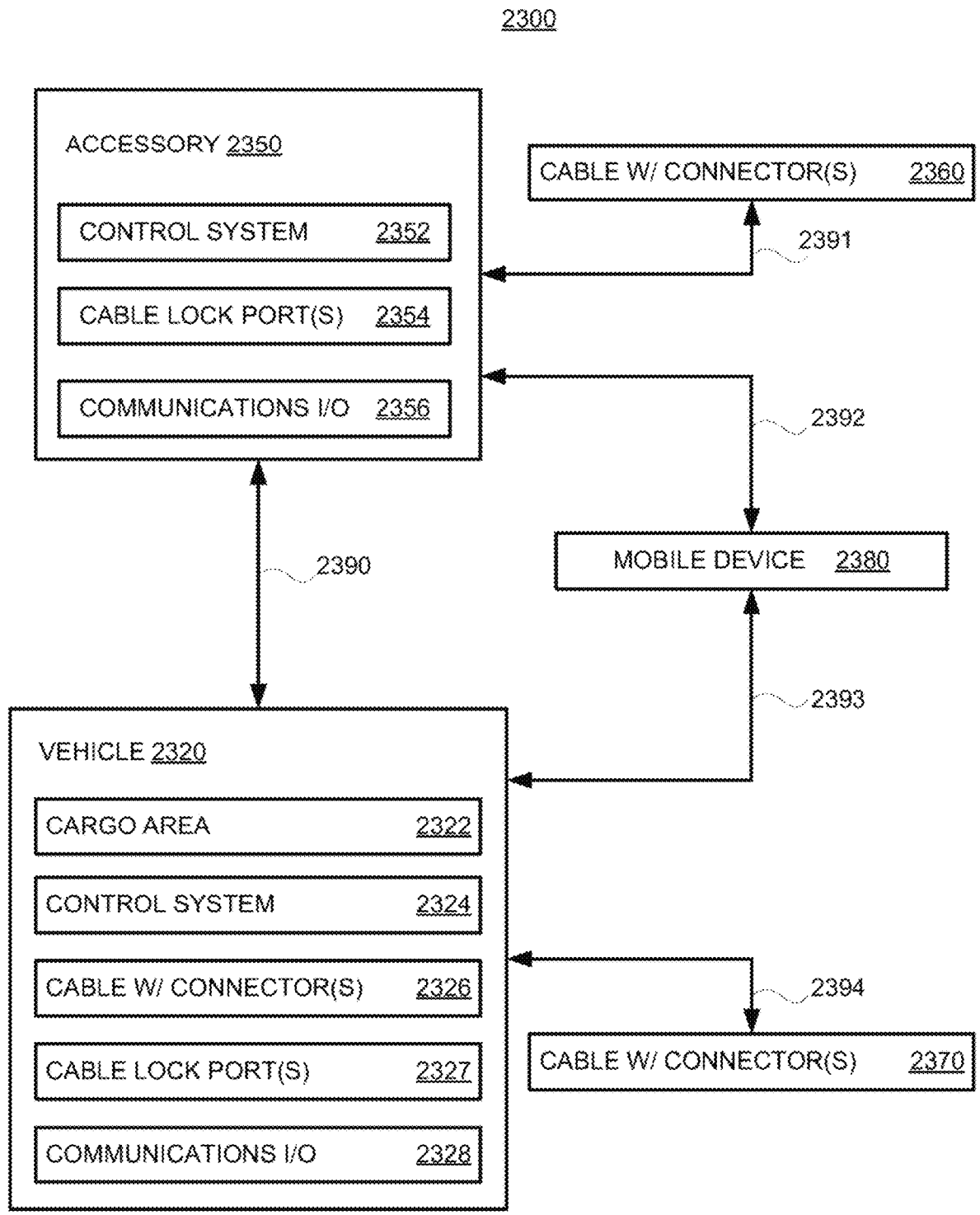
FIG. 23 shows a block diagram of an illustrative arrangement including a vehicle, an illustrative accessory, a mobile device, and illustrative cable locks, in accordance with some embodiments of the present disclosure.

FIG. 23 shows a block diagram of illustrative arrangement 2300 including vehicle 2320, illustrative accessory 2350, mobile device 2380, and illustrative cables 2360 and 2370, in accordance with some embodiments of the present disclosure.

Vehicle 2320 includes cargo area 2322, control system 2324, cable 2326, cable lock port(s) 2327, and communications I/O 2328. Cargo area 2322 may include a truck bed, a trunk, a storage area, a roof, any other suitable area of a vehicle, or any combination thereof. Control system 2324 may be integrated into the vehicle's primary control system, included as a stand-alone unit installed in the vehicle (e.g., and optionally powered by the vehicle), or a combination thereof (e.g., an after-market system that is installed integral to the vehicle). Cable 2326 includes one end fixed to the structure of vehicle 2320, and one free end configured to intertwine with equipment for securement. Cable lock port(s) 2327 include ports configured to engage a connector of cable 2326. Cable lock port(s) 2327 include one or more electrical terminals configured to electrically contact electrical terminals of the connector. Communication I/O 2328 is optionally included to communicate with optional mobile device 2380, optional accessory 2350, or both, for example. In some embodiments, communications I/O 2328 may include Internet connectivity, and accordingly may interact with a web application.

Optional accessory 2350 includes control system 2352, cable lock port(s) 2354, and communications I/O 2356. In some embodiments, accessory 2350 is configured to communicate with vehicle 2320 via communications link 2390. In some embodiments, accessory 2350 is configured to communicate with mobile device 2380 via communications link 2392. Control system 2352 may be coupled to electrical terminals of cable lock port(s) 2354. Cable lock port(s) 2354 include ports configured to engage a connector of a cable (e.g., cable 2326 or cable 2360). Cable lock port(s) 2354 include one or more electrical terminals configured to electrically contact electrical terminals of the connector of the cable. Communication I/O 2356 is optionally included to communicate with optional mobile device 2380, vehicle 2320, or both, for example.

Optional mobile device 2380 is configured to communicate with accessory 2350, vehicle 2320, or both. In some embodiments, mobile device 2380 is configured to communicate with vehicle 2320 via communications link 2393. Mobile device 2380 may include, for example, a tablet computer, a smart phone, a key fob, a smart watch, another other suitable device, or any combination thereof. Communications links 2392 and 2394 may include Bluetooth, WiFi, 3G, 4G, near-field communication (NFC), any other suitable communications link, or any combination thereof. In some embodiments, mobile device 2380 includes one or more software applications configured to provide information to, and receive information from, vehicle 2320 and accessory 2350.

Optional cables 2360 and 2370 may each include a cable having two connectors (i.e., one at each end). Cables 2360 and 2370 may be capable of being coupled to any suitable ports and not necessary affixed to vehicle 2320. For example, cables 2360 and 2370 may be coiled and stored in storage cases, which may be, but need not be, kept with vehicle 2320.

It should be noted that any of the devices or systems discussed in relation to FIGS. 1-18 and 23 may be used to perform one or more of the steps in illustrative processes 1900-2100 in FIGS. 19-21, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system, comprising:
control circuitry in a vehicle;
a first latch coupled to the control circuitry, wherein the first latch is configured to secure a first cable connector to the vehicle; and
a second latch coupled to the control circuitry, wherein:
the second latch is configured to secure a second cable connector to the vehicle, and
the first cable connector and the second cable connector are affixed at opposite ends of a cable.

2. The system of claim 1, wherein the first latch is arranged in a storage area of the vehicle.

3. The system of claim 1, further comprising one or more indicator lights configured to indicate a state of the first cable connector.

4. The system of claim 1, further comprising one or more indicator lights configured to indicate a secured state of the first cable connector.

5. The system of claim 1, wherein the first latch is configured to secure or release the first cable connector based on a user indication from a mobile device.

6. The system of claim 1, wherein the first latch is configured to secure or release the first cable connector based on a user indication from a touchscreen of the vehicle.

7. The system of claim 6, wherein the control circuitry is configured to:
determine whether the user indication is authorized; and
if the user indication is authorized, cause the first latch to release the first cable connector.

8. The system of claim 1, further comprising a port on an exterior of the vehicle configured to engage with the first cable connector, wherein the control circuitry is further configured to:
determining whether the first cable connector is arranged in the port for securement; and
cause the first latch to be secured based at least in part on whether the first cable connector is arranged for securement.

9. The system of claim 1, further comprising one or more indicator lights configured to indicate a state of the first cable connector and the second cable connector.

10. The system of claim 1, wherein the control circuitry is configured to:
detect the first cable connector is coupled to a first port of the vehicle;
detect the second cable connector is coupled to a second port of the vehicle;
apply a test signal to the first cable connector; and
detect the test signal at the second cable connector.

11. A system, comprising:
a first latch arranged at a first port and configured to secure a first connector of a cable to the first port;
a second latch arranged at a second port and configured to secure a second connector of the cable to the first port, wherein the first port and the second port are arranged at an exterior of a vehicle; and
control circuitry coupled to the first latch and the second latch, wherein the control circuitry is configured to:
cause the first latch to secure the first connector to the vehicle; and
cause the second latch to secure the second connector to the vehicle, wherein the first connector and the second connector are affixed at opposite ends of the cable.

12. The system of claim 11, wherein the first port and the first latch are arranged in a storage area of the vehicle.

13. The system of claim 11, further comprising one or more indicator lights configured to indicate a state of the first connector.

14. The system of claim 11, wherein the first latch is configured to secure or release the first connector based on an indication from one of a mobile device or a touchscreen of the vehicle.

15. A method comprising:
detecting, using control circuitry, a first cable connector of a cable is engaged with a first port of a vehicle;
detecting, using the control circuitry, a second cable connector of the cable is engaged with a second port of the vehicle;
causing, using the control circuitry, a first latch to secure the first cable connector; and
causing, using the control circuitry, a second latch to secure the second cable connector.

16. The method of claim 15, further comprising generating an indication using one or more indicator lights configured to indicate a secured state or a released state of the first latch.

17. The method of claim 15, further comprising:
receiving an indication to release the first cable connector; and
causing the first latch to release the first cable connector based on the indication.

18. The method of claim 17, wherein the indication is provided by a mobile device based on a user indication.

* * * * *